(12) United States Patent
Furst

(10) Patent No.: US 6,335,748 B1
(45) Date of Patent: Jan. 1, 2002

(54) ON-LINE IMAGE-ON-IMAGE COLOR REGISTRATION CONTROL SYSTEMS AND METHODS BASED ON TIME-SCHEDULED CONTROL LOOP SWITCHING

(75) Inventor: Michael Robert Furst, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/306,418

(22) Filed: May 6, 1999

(51) Int. Cl.$^7$ .......................... B41J 2/385; G03G 15/00
(52) U.S. Cl. ...................... 347/116; 347/234; 399/395
(58) Field of Search .................... 347/116, 129, 347/229, 248, 262, 264, 234; 399/394, 395; 400/579; 250/559.37, 559.36, 559.29, 559.3; 358/300

(56) References Cited

U.S. PATENT DOCUMENTS

| | | | |
|---|---|---|---|
| 4,916,547 A | | 4/1990 | Katsumata et al. ......... 358/300 |
| 5,021,676 A | * | 6/1991 | Dragon et al. ......... 250/559.37 |
| 5,383,006 A | | 1/1995 | Castelli ....................... 347/116 |
| 5,384,592 A | * | 1/1995 | Wong ......................... 347/116 |
| 5,406,359 A | | 4/1995 | Fletcher ...................... 399/296 |
| 5,537,190 A | | 7/1996 | Folkins et al. ............... 399/41 |
| 5,774,153 A | * | 6/1998 | Kuehnle et al. ............ 347/129 |

\* cited by examiner

Primary Examiner—Hai C. Pham
(74) Attorney, Agent, or Firm—Oliff & Berridge, PLC

(57) ABSTRACT

Color imaging methods and systems allow each color image to be registered in a composite manner. An image-on-image registration controller of an image forming device adjusts the control signals which control the output of image data to reduce or eliminate image registration offsets. In particular, two separate feedback loops are combined to monitor and adjust image registration without going off-line for a set-up procedure. These two feedback loops include a dynamic skew control feedback loop, which monitors and adjusts the edge position of the photoreceptor belt to infer lateral registration, and a direct image registration feedback loop, which monitors and adjusts relative image registration directly. The control signals are adjusted based on a determined image registration offset. The image processing device outputs an image based on the control signals adjusted based on a determined image registration offset. As the image's registration changes, the image-on-image registration controller determines and applies the necessary adjustments to the controls signals to keep the differently-colored images registered throughout the print run. The systems and methods permit many off-line set-up procedures the eliminated and increase the image quality by constantly adjusting for registration offsets.

17 Claims, 16 Drawing Sheets

ON-LINE IMAGE-ON-IMAGE COLOR REGISTRATION CONTROL SYSTEMS AND METHODS BASED ON TIME-SCHEDULED CONTROL LOOP SWITCHING

BACKGROUND OF THE INVENTION

1. Field of Invention

This invention generally relates to detecting and maintaining good image registration in color image processing. More particularly, this invention relates to methods and systems in which image registration between color separation images of a full color image is monitored and adjusted during a print run.

2. Description of Related Art

Electrophotography, a method of copying or printing documents, is performed by exposing an image representation of a desired original image onto a substantially uniformly charged photoreceptor, such as a belt. In response to that image representation, the photoreceptor discharges to create a latent image of the desired original image on the photoreceptor's surface. Developing material, or toner, is then deposited onto the latent image to form a developed image. The developed image is then transferred to a final substrate, such as paper. The surface of the photoreceptor is then cleaned of residual developing material and recharged in preparation for the production of another image.

Color images may be produced by repeating the above process once for each differently colored toner that is used to make a composite color image. For example, in one color imaging process, referred to herein as the Recharge, Expose, and Develop, Image On Image (REaD IOI) process, a charged photoreceptor surface is exposed to an image which represents a first color. The resulting electrostatic latent image is then developed with a first colored toner to form a first color separation image. The charge, expose and develop process is repeated, for example, for a second colored toner, then for a third colored toner, and finally for a fourth colored toner to form second, third and fourth color separation images. The various differently-colored color separation images are placed in superimposed registration with the first developed color separation image so that a desired composite color image results. The composite color image is then transferred and fused onto an image recording substrate or medium.

SUMMARY OF THE INVENTION

Registration offsets in a developed image are undesirable because, if the developed image is transferred to a final substrate without adjusting for the registration offsets, the final transferred image will include the registration offsets. That is, each different color separation image will be slightly misregistered, or offset, relative to the other color separation images and/or the receiving substrate. These registration offsets, even if only a few mils or tens of microns, are well within the visual acuity of the human eye. Since the human eye can sense these misregistrations, the quality of the resulting image suffers greatly even for small registration offsets.

This invention provides color imaging methods and systems where each color separation image is to be registered in a composite manner.

This invention provides systems and methods that improve the registration between the color separation images.

This invention separately provides systems and methods that control the output of the image data for one or more of the color separation images to remove or reduce registration offsets.

This invention separately provides an image-on-image registration controller for an image forming device that controls the output of the image data for one or more of the color separation images to reduce or eliminate image registration offsets.

This invention separately provides first control systems and methods that control the output of the image data based on higher frequency but transitory offset results from dynamic skewing of the image forming device.

This invention separately provides for second control systems and methods that control the output of the image data based on lower frequency offsets resulting from thermal and other slower variations in the image forming device.

This invention separately provides control systems and methods that directly measure the positions of the color separation images on the image forming device.

This invention further provides marks-on-belt sensors to directly measure the positions of the color separation images on the image forming device.

This invention separately provides systems and methods that switch between first control systems and methods and second control systems and methods.

The systems and methods of this invention combine two separate feedback techniques so that the image registration can be monitored and adjusted without going off-line for a set-up procedure. In one aspect of the systems and methods of this invention, a dynamic skew control feedback loop in which the edge position of the photoreceptor belt is monitored and adjusted to infer lateral registration is combined with a direct image registration feedback loop in which the relative image registration is directly monitored and adjusted.

The systems and methods of this invention eliminate many off-line set-up procedures and increase the image quality by constantly adjusting for registration offsets.

In accordance with the systems and methods of this invention, problems in registration, such as misalignment, are reduced or eliminated without going off-line.

In another aspect of the systems and methods of the invention, image data is adjusted based on determined image registration offsets. In yet another aspect of the systems and methods of this invention, the image processing device outputs an image based on image control data adjusted based on determined image registration offsets.

The systems and methods of this invention provide an image processing device that, as the image registration changes, determines and applies the necessary adjustments to the image control data to keep the different color separation images registered throughout the print run.

These and other features and advantages of the systems and methods of this invention are described in or are apparent from the following detailed description of the preferred embodiments.

BRIEF DESCRIPTION OF THE DRAWINGS

The invention will be described in relation to the following drawings, in which reference numerals refer to like elements, and wherein.

DETAILED DESCRIPTION OF PREFERRED EMBODIMENTS

Figure 1:
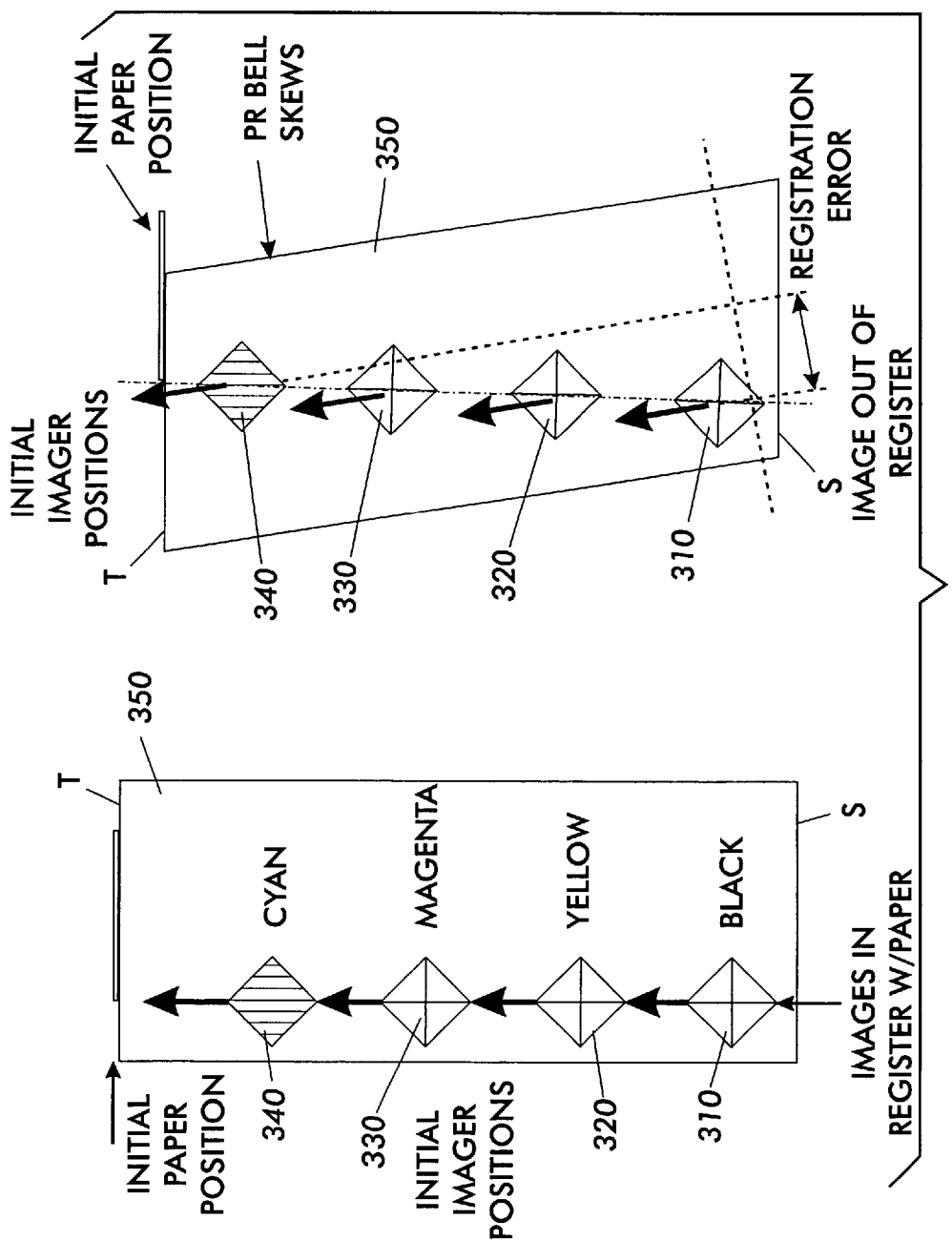
FIG. 1 shows an example of registration in a full color image forming system.

FIG. 1 shows an example of one of the registration offset effects recognized and adjusted for by the systems and methods according to this invention. During a print run, the photoreceptor belt travels from a steering end S to a transfer end T of the imager, and a registration error is observed on the photoreceptor belt 350. The magnitude of the error for a fourth station 340, e.g., a CYAN station, which is the farthest from a first station 310, e.g., a BLACK station, is the largest. The error decreases generally linearly as the distance between the imagers decreases. This registration offset of the photoreceptor belt 350 occurs during the initial start-up operation of the system at the beginning of print runs. Other types of registration offset errors begin to dominate the system as the printing time increases. These errors include alignment or spacing changes due to thermal, or other changes in the system. Examples of some additional errors which the systems and method of this invention will measure and automatically correct for include image skew, lateral margin delay, process margin delay and lateral magnification.

Figure 2:
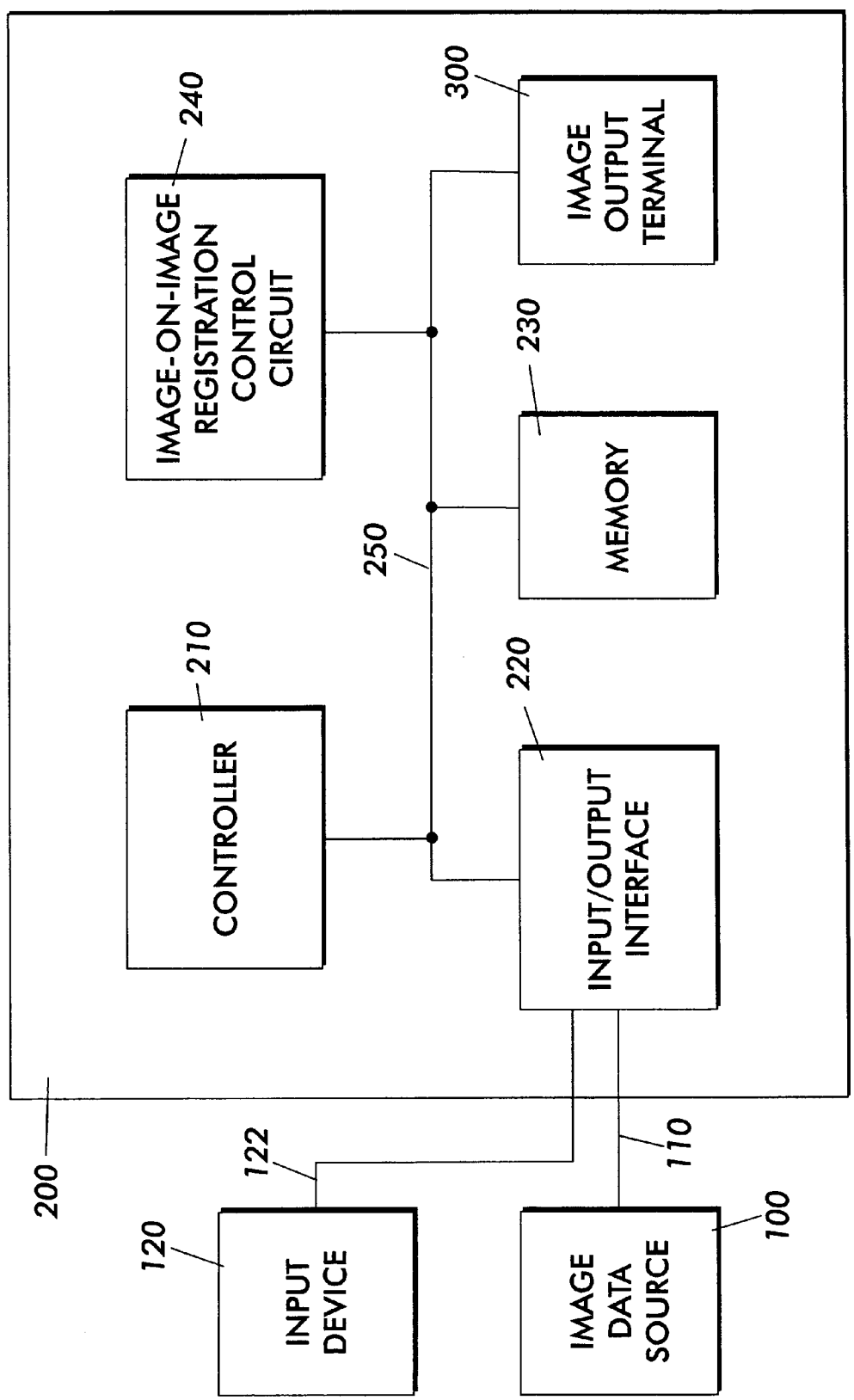
FIG. 2 shows one exemplary embodiment of a functional block diagram of an image processing apparatus that incorporates the image-on-image registration control systems and methods in accordance with this invention.

FIG. 2 shows one exemplary embodiment of an image processing apparatus 200 incorporating the image-on-image registration control systems and methods in accordance with this invention. As shown in FIG. 2, an image data source 100 and an input device 120 are connected to the image processing apparatus 200 over links 110 and 122, respectively. The image data source 100 can be a digital camera, a scanner, or a locally or remotely located computer, or any other known or later developed device that is capable of generating electronic image data. Similarly, the image data source 100 can be any suitable device that stores and/or transmits electronic image data, such as a client or a server of a network. The image data source 100 can be integrated with the image processing apparatus 200, as in a digital copier having an integrated scanner. Alternatively, the image data source 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 100 is thus any known or later developed device which is capable of supplying electronic image data over the link 110 to the image processing apparatus 200. The link 110 can thus be any known or later developed system or device for transmitting the electronic image data from the image data source 100 to the image processing apparatus 200.

The input device 120 can be any known or later developed device for providing control information from a user to the image processing apparatus 200. Thus, the input device 120 can be a control panel of the image processing apparatus 200, or could be a control program executing on a locally or remotely located general purpose computer, or the like. As with the link 110 described above, the link 122 can be any known or later developed device for transmitting control signals and data input using the input device 120 from the input device 120 to the image processing apparatus 200.

As shown in FIG. 2, the image processing apparatus 200 includes a controller 210, an input/output interface 220, a memory 230, an image-on-image registration control circuit 240 and an image output terminal 300, each of which is interconnected by a control and/or data bus 250. The links 110 and 122 from the image data source 100 and the input device 120, respectively, are connected to the input/output interface 220. The electronic image data from the image data source 100, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed or non-volatile memory device.

The image-on-image registration control circuit 240 adjusts the control information for the electronic data stored in the memory 230 for each different color subimage, or color separation image, of the electronic image data, based on the current value for the skew of the photoreceptor belt in the image output terminal 300. The image-on-image registration control circuit 240 then outputs adjusted image control signals that control how the electronic image data is outputting the image output terminal 300. The image-on-image registration control circuit 240 provides the image processing apparatus 200 with the capability to monitor and adjust the image-on-image color registration while making prints.

It should be appreciated that the steering of the photoreceptor belt 350 can also be controlled based on the current value for the skew of the photoreceptor belt 350. This steering control system is described in U.S. patent application Ser. Nos. 09/240,880 and 09/291,072, each incorporated herein by reference in its entirety. Furthermore, it should also be appreciated that the lateral position of the photoreceptor belt 350 can be controlled using a passive system instead of the active steering control system described in the incorporated '880 application. This passive system is described in U.S. Pat. No. 5,383,006 to Castelli, incorporated herein by reference in its entirety.

While FIG. 2 shows the image-on-image registration control circuit 240 and the image output terminal 300 as portions of an integrated system, the image-on-image registration control circuit 240 could be provided as a separate device from the image output terminal 300. That is, the image-on-image registration control circuit 240 may be a separate device attachable upstream of a stand-alone image output terminal 300.

Figure 3:
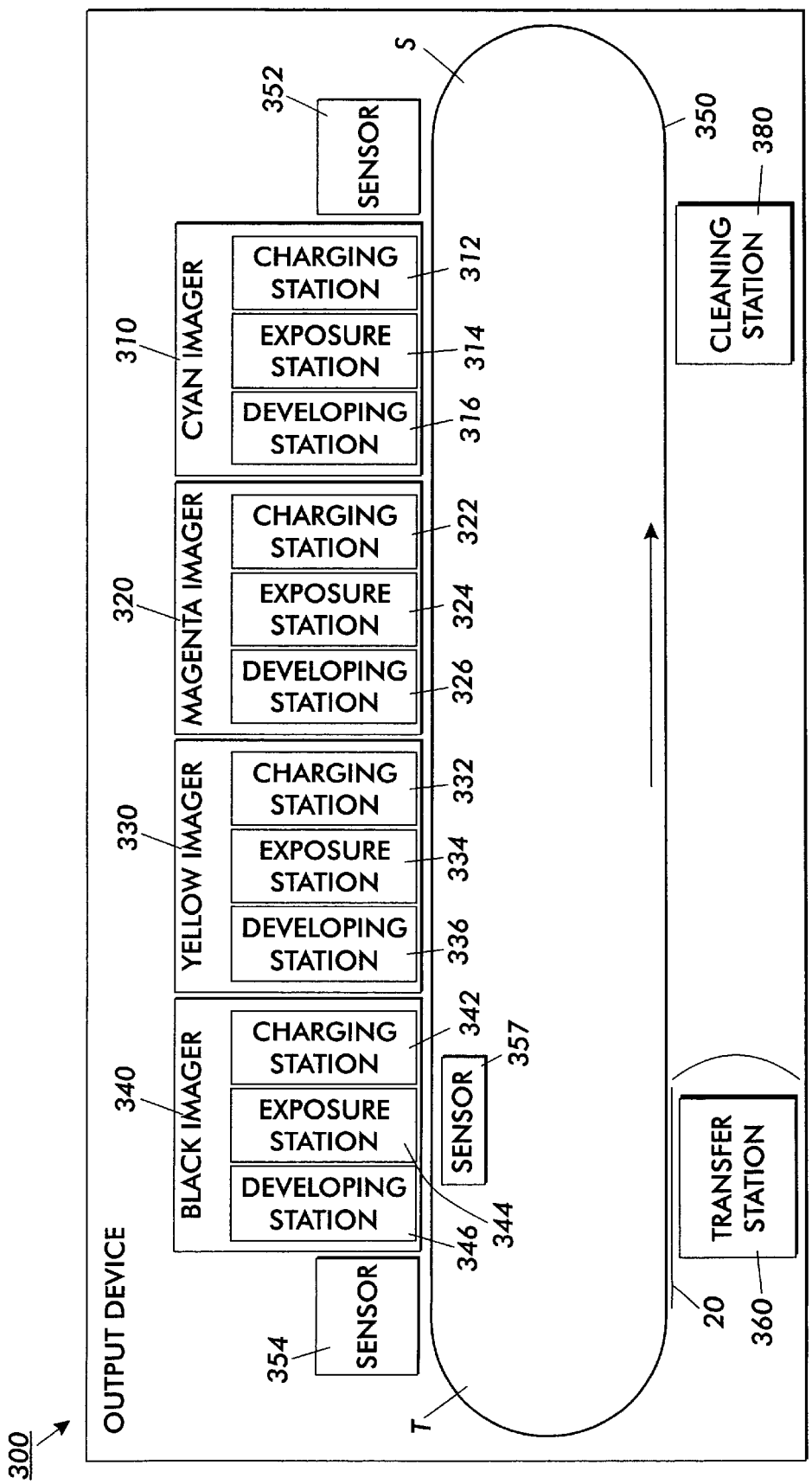
FIG. 3 shows one exemplary embodiment of an image forming device that incorporates the image-on-image registration control systems and methods of this invention.

For example, the image-on-image registration control circuit 240, a plurality of dynamic skew control sensors 352 and 354, and a pair of direct image registration sensors 357, as shown in FIG. 3, may be implemented as devices which interface with both the image data source 100 and the hard image output terminal 300. For example, the image-on-image registration control circuit 240 may be incorporated into a network print server that forms a portion of the image data source 100 and that receives the sensor signals from the dynamic skew control sensors 352 and 354, and the direct image registration sensors 357, and controls the output of the image data by the image output terminal 300.

Furthermore, the image-on-image registration control circuit 240 may be implemented as software executing on the image processing apparatus 200 and/or the image data source 100. Other configurations of the elements shown in FIGS. 2 and 3 may be used without departing from the spirit and scope of this invention.

FIG. 3 shows one exemplary embodiment of the image output terminal 300 according to this invention. As shown in FIG. 3, the image output terminal 300 includes a plurality of color imagers 310–340, a photoreceptor belt 350, a transfer station 360, and a cleaning station 380. Each of the color imagers 310–340 are located along the length of the photoreceptor belt 350 from a steering end S of the belt 350 to a transfer end T of the belt 350, respectively. In particular, each of the color imagers 310–340 includes a charging station 312, 322, 332, and 342, respectively, an exposure station 314, 324, 334, and 344, respectively, and a developing station 316, 326, 336, and 346, respectively.

It should be appreciated that the color imagers 310–340 may be located on different spans of the photoreceptor belt 350. For example, one or more of the imagers 310–340 may be located on a span of the photoreceptor belt 350 that extends from the transfer end T to the steering end S of the photoreceptor belt 350. In this case, any such imager will be located on the opposite side of the image output terminal 300 than the other imagers.

It should also be appreciated that, while FIG. 3 shows a photoreceptor as the imaging substrate affected by registration offset, the image output terminal 300 may use other imaging substrates. For example, the image-on-image registration control systems and methods of this invention can be applied with equal effectiveness to a non-photoreceptor intermediate belt system that builds color image separation layers on one or more physically separate photoreceptors and transfers the images to an intermediate belt before transferring the images from the intermediate belt to a final substrate. This intermediate belt system is described in U.S. Pat. No. 5,406,359 to Fletcher, incorporated herein by reference in its entirety.

Alternatively, the image-on-image registration control systems and methods of this invention can be applied to a transport belt system which forms the images on one or more separate photoreceptors and transfers the color image separation layers to a final substrate carried by a transport belt. This transfer belt system is described in U.S. Pat. No. 4,916,547 to Katsumara et al., incorporated herein by reference in its entirety. In these systems, the imaging stations can be considered to also include the photoreceptor on which the images are formed and from which the images are transferred.

In the exemplary embodiment shown in FIG. 3, each of the respective charging stations 312–342 of the imagers 310–340 uniformly charges the photoreceptor belt 350 in preparation for forming a latent electrostatic image. In each of the imagers 310–340, each of the respective exposure stations 314–344 exposes the uniformly charged photoreceptor belt 350 to form the latent image on the photoreceptor belt 350. Then, in each of the imagers 310–340, each of the respective developing stations 316–346 applies toner of a different color to develop the latent image formed on the photoreceptor belt 350 using the differently-colored toner.

It should be appreciated that each of the exposure stations 314–344 may be implemented using any known or later developed device for forming a latent image on the photoreceptor belt 350. For example, the exposure stations 314–344 could be a rotating polygon raster output scanner (ROS), a full width printbar containing light emitting diodes, laser diodes, organic light emitting diodes or the like.

The dynamic skew control sensors 352 and 354 determine the dynamic skew registration offset in accordance with the edge position of the photoreceptor belt 350. A pair of direct image registration sensors 357 determine the direct image registration offset in accordance with the position of the images on the photoreceptor belt 350. The image-on-image registration control circuit 240 then determines the amounts of registration offset based on the lateral belt position signals generated by the dynamic skew control sensors 352 and 354, and/or image position signals generated by the pair of direct image registration sensors 357, at the belt positions corresponding to the various positions where the exposure stations 314–344 are writing the latent images on the photoreceptor belt 350.

Based on the registration offsets at the writing positions of each of the exposure stations 314–344 determined by the image-on-image registration control circuit 240, the image-on-image control circuit 240 modifies the image control signals that control the output of the imager data by at least three of the imagers 310–340, so that the latent images written by each of the exposure stations 314–344 will be substantially aligned. Accordingly, when the latent images formed at the exposure stations 314–344 are developed at the corresponding one of the developing stations 316–346, the resulting color separation images, or layers, formed by each of the imagers 310–340 will be substantially aligned with each other, thus minimizing the misregistration between the various color separation images formed by the imagers 310–340. The positions of the various color separation images on the photoreceptor belt 350 will be adjusted in several dimensions to achieve appropriate alignment accuracy. In one exemplary embodiment of the systems and methods of this invention, the various color separation images are adjusted in magnification, margin, and skew.

The resulting color separation images, or layers, formed by each of the imagers 310–340 can also be substantially aligned with a desired position on the receiving substrate. Accordingly, when the resulting color separation images, or layers, are transferred onto the receiving substrate 20 at the transfer station 360, the resulting color separation images, or layers, formed by each of the imagers 310–340 will be substantially aligned with the desired position on the receiving substrate 20. This minimizes, for example, any misregistration between the various color separation images, or layers, formed by the imagers 310–340 and any other images on the receiving substrate 20.

Figure 4:
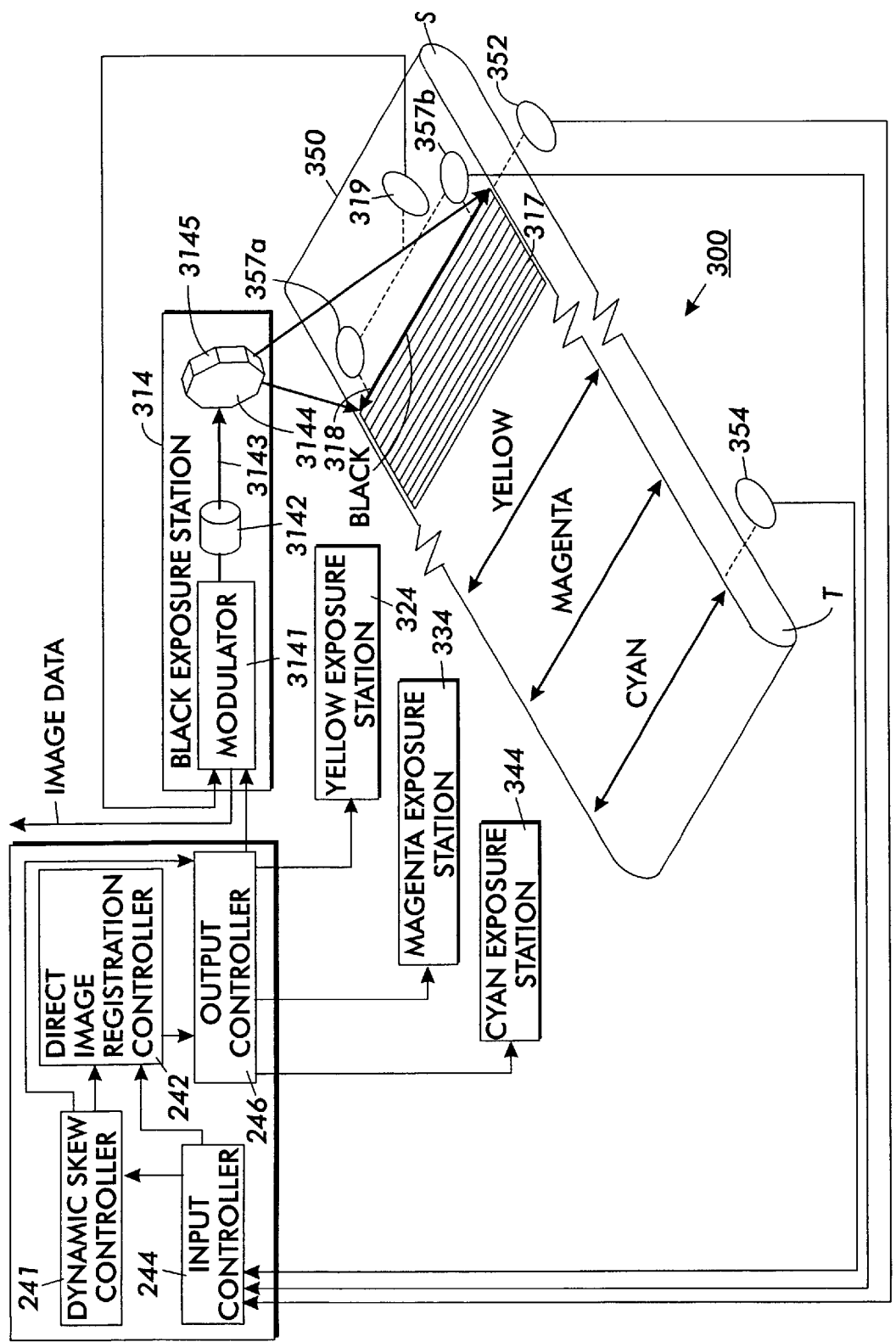
FIG. 4 shows in greater detail the photoreceptor belt shown in FIG. 3 and one exemplary embodiment of the image-on-image registration control system of FIG. 2 in accordance with this invention.

FIG. 4 shows in greater detail one exemplary embodiment of the image output terminal 300 shown in FIG. 3 and the image-on-image control circuit 240 shown in FIGS. 2. As shown in FIG. 4, in this exemplary embodiment of the image output terminal 300, each of the imagers 310–340 are implemented using a raster output scanner to expose the photoreceptor belt 350. As shown in FIG. 4, each of the exposure stations 314–344 includes a modulator 3141 that modulates one or more light beams based on the input image data. A light emitting device 3142 is connected to the modulator 3141 and emits the at least one light beam 3143 modulated by the modulator 3141. Each light beam 3143 emitted by the light emitting device 3142 is imaged onto a facet 3145 of a rotating polygon 3144 by a set of input optics (not shown). Each light beam reflected from the current facet 3145 of the rotating polygon 3144 is imaged onto the photoreceptor belt 350 using a set of output optics (not shown).

It should be appreciated that the image output terminal 300 can use any other known or later developed imager. Such imagers include, but are not limited to, LED bars or linear arrays of exposure devices.

As shown in FIG. 4, a particular color image separation layer 317 formed on the photoreceptor belt 350 comprises a plurality of scanlines 318. Each scanline 318 has a beginning point and an ending point. The beginning point, or "start of scan" point, is the point at which the current facet 3145 of the rotating polygon mirror 3144 directs each of the one or more light beams 3143 onto an appropriate portion of the photoreceptor belt 350 such that image data can be recorded. A start of scan sensor 319 senses when the one or more light beams are at the "start of scan" point. Each start-of-scan sensor 319 independently determines the "start of scan" point for the corresponding exposure station and independently provides suitable feedback signals to the corresponding exposure station. The feedback signals from the start-of-scan sensors 319 to the imager 310–340 indicate the position of the one or more light beams 3143 on the photoreceptor belt 350. These feedback signals are input to the modulator 3141 of the corresponding exposure station of the imagers 310–340. The feedback signals from the start-of-scan sensors 319 can be used to control the lateral margin position of the scanlines 318.

It should be appreciated that the feedack signals can be input by sensors other than the start of scan sensors 319. Such sensors include, but are not limited to, end-of-scan sensors or a combination of start-of-scan and end-of-scan sensors.

The image-on-image registration control circuit 240, based on the current value for the registration offset of the photoreceptor belt 350, generates, for each imager 310–340, an imager-specific control signal used by the corresponding modulator 3141. Using the control signal, the image-on-image registration control circuit 240 determines, in response to receiving the start-of-scan signal from the corresponding start-of-scan sensor 319, when to begin modulating the one or more light beams 3143 based on the image data for the current scanline. That is, based on the timing control signals from the image-on-image registration control circuit 240 and the feedback signals from the start-of-scan sensor 319, the modulator 3141 begins modulating the light beam 3143 based on the image data for the current scanline at a point in time which eliminates the registration offsets. The modulated light beam 3143 is then emitted by the light emitting device 3142 and is imaged onto a facet 3145 of a rotating polygon 3144.

Figure 5:
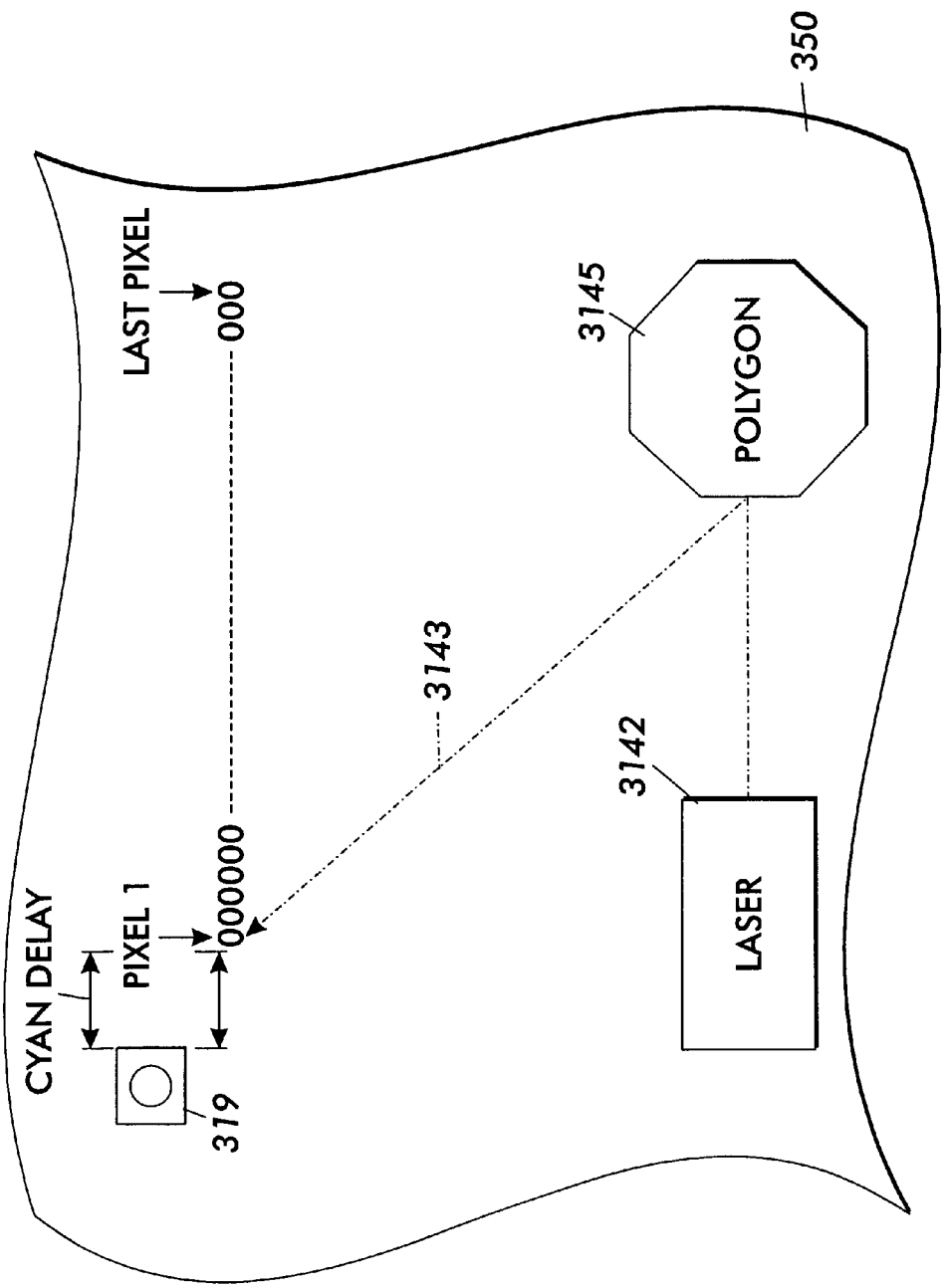
FIG. 5 illustrates how adjusting the lateral margin delay modifies the position of a scanline on the imaging substrate.
Figure 6:
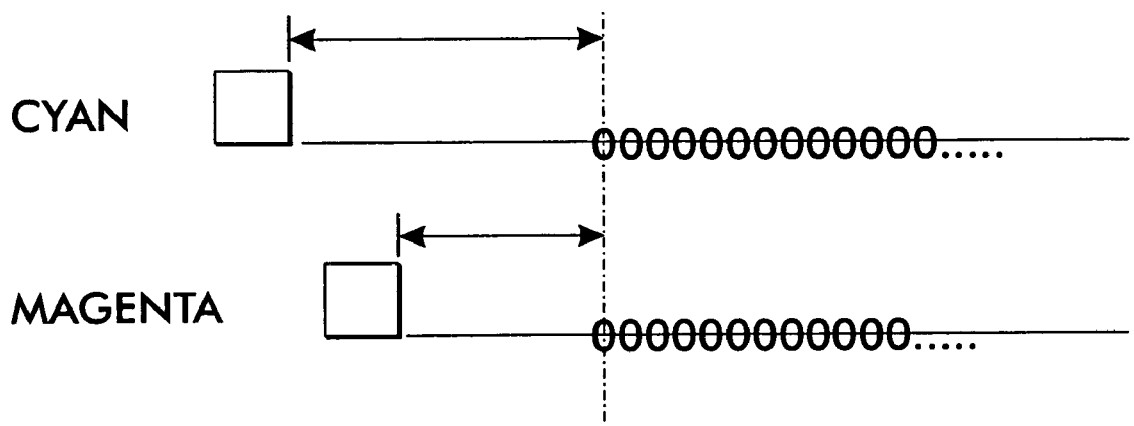
FIG. 6 illustrates the differing amount of physical offset relative to the receiving substrate that can occur between two imaging stations and how adjusting the lateral margin delay due to this offset aligns the corresponding separation layers.

The image-on-image registration control circuit 240 adds a dynamic lateral margin delay to the modulators 3141 to a predetermined lateral margin delay already applied by the modulators. This predetermined lateral margin delay is used to remove any offset errors caused by a physical imager misalignment of the imagers 310–340 from each other. As shown in FIGS. 5 and 6, for each imager 310–340, this physical imager misalignment between the color image separation layers can be removed by adding an imager-specific predetermined lateral margin time delay between sensing the laser beam at the start-of-scan position, as sensed by the corresponding start-of-scan sensor 319; and modulating the corresponding light beam based on the image data.

FIG. 6 illustrates the differing amount of physical offset relative to the photoreceptor belt 350 that can occur between two imagers. As shown in FIG. 6, different imager-specific delays for the physical imager misalignment are introduced for each of the two images to produce registered images. By introducing an imager-specific predetermined lateral margin delay, the different color image separation layers are aligned with one another, assuming there is no dynamic lateral margin registration offset.

By knowing the amount of dynamic lateral margin registration offset, the imager-specific predetermined lateral margin delay and the position of the one or more light beams 3143 along the photoreceptor belt 350, the image-on-image registration control circuit 240 can control the output of the image data by the imagers 310–340 to compensate for the amount of lateral margin registration offset. In particular, the latent image is formed by modulating each light beam 3143 emitted by the light emitting device 3142 based on the electronic image data received from the memory 230 over the control and/or data bus 250, the feedback signals from the start-of-scan sensor 319 and the control signals from the image-on-image registration control circuit 240. Thus, by controlling, based on the amount of dynamic lateral margin registration offset and the image-specific predetermined lateral margin delay, the relative lateral location of each scanline 318 on the photoreceptor belt 350 can be very precisely controlled.

In a similar manner to the lateral margin adjustments described above, image skew, lateral magnification, and process margin can be adjusted. In one exemplary embodiment of the image-on-image registration control systems and methods of this invention, the lateral margin is adjusted through the start-of-scan delay, as described. The image skew is adjusted through a mechanism which physically moves the image source to correct the skew. The lateral magnification is adjusted by speeding up or slowing down the pixel clock. The process margin is adjusted by adjusting the delay between image panel timing signals and the start-of-scan signal. In particular, the image-on-image registration control systems and methods of this invention use a combination of physical adjustment, timing delay and start-of-scan delay adjustments.

Figure 7:
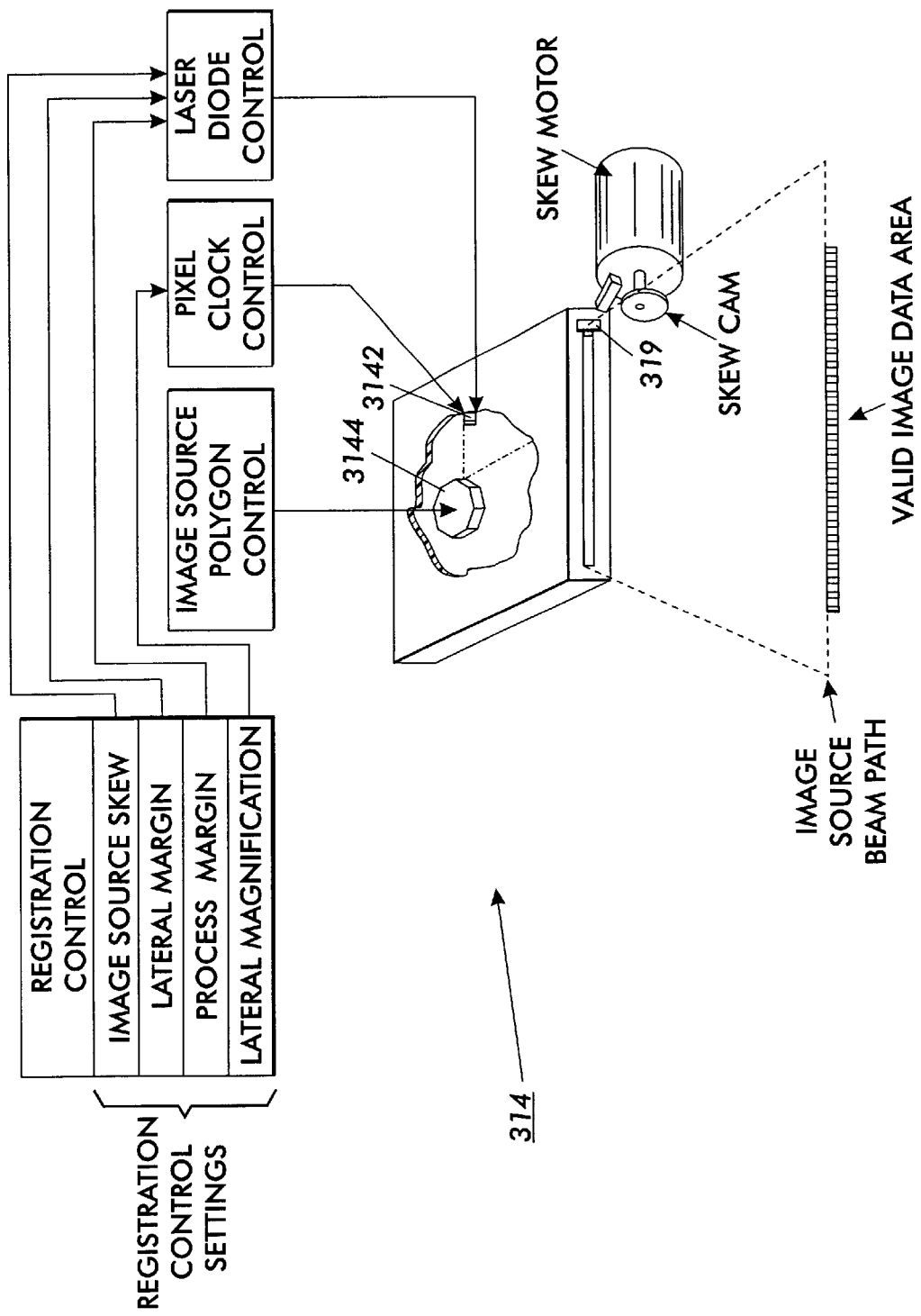
FIG. 7 shows an exemplary embodiment of the image-on-image registration control system of FIG. 4 incorporating registration control settings for each of the imagers shown in FIG. 4.

FIG. 7 shows an exemplary embodiment of the image-on-image registration control circuit 240 illustrating the registration control settings for each imager 310–340 used by the image-on-image registration control circuit 240. As shown in FIG. 7, each imager 310–340 has registration control settings that include image skew, lateral margin, process margin and lateral magnification. By appropriately setting the registration control settings, the various actuators in each imager may be controlled to align the imagers 310–340 with each other. By knowing the amount of adjustments to be made to the registration control settings, the image-on-image registration control circuit 240 can control the output of the image data by the imagers 310–340. Thus, by controlling the registration control settings, the placement of each scanline 318 on the photoreceptor belt 350 can be very precisely controlled.

Figure 8:
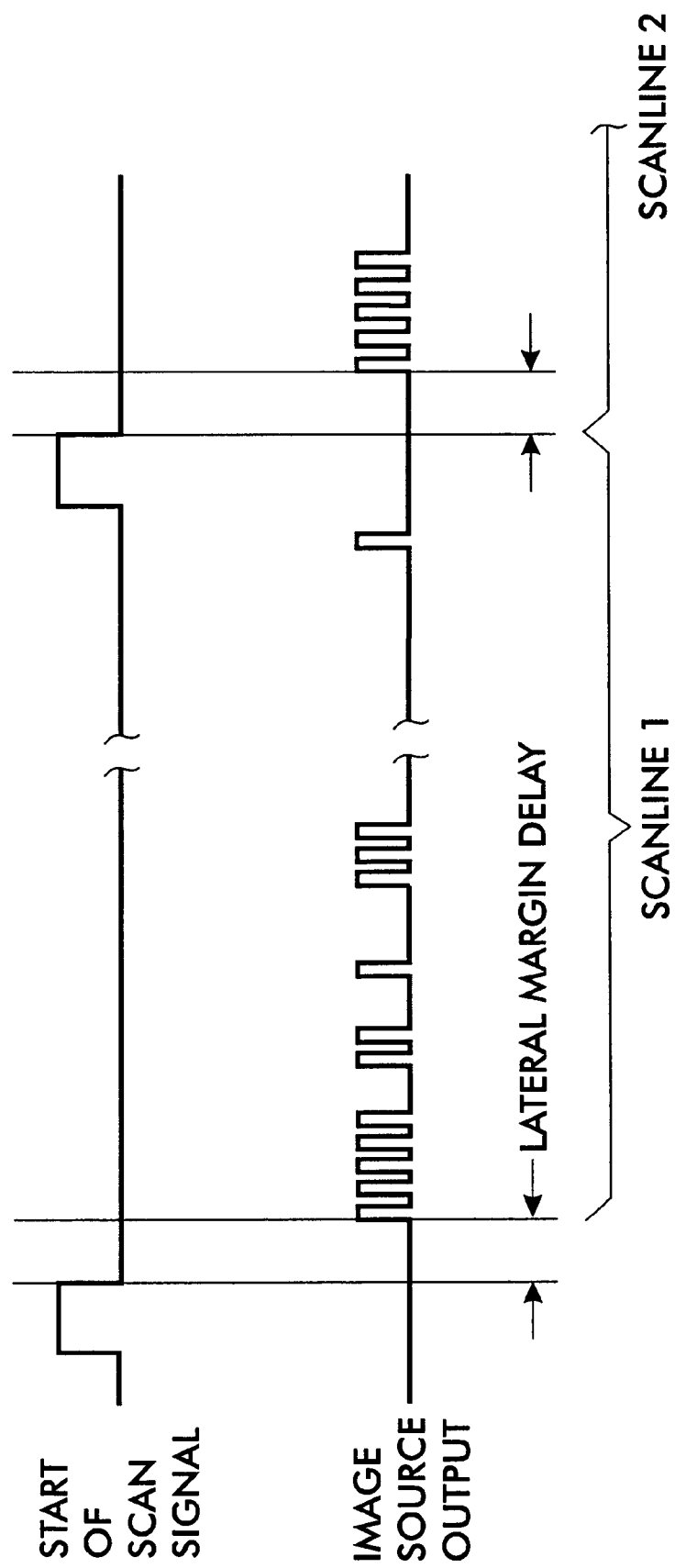
FIG. 8 illustrates how the lateral margin is adjusted.

As shown in FIG. 8, the lateral margin is adjusted by varying the full scanline and fractional delay in time or pixel counts between generating the start-of-scan signal and modulating the light emitting device 3142 using the modulator 3141 based on the image data for the first pixel of the current scanline. As shown in FIG. 6, different imager-specific delays are introduced for each of the two images to produce registered images. By varying the imager-specific predetermined lateral margin delay, the different color image separation layers are laterally aligned with one another.

Figure 9:
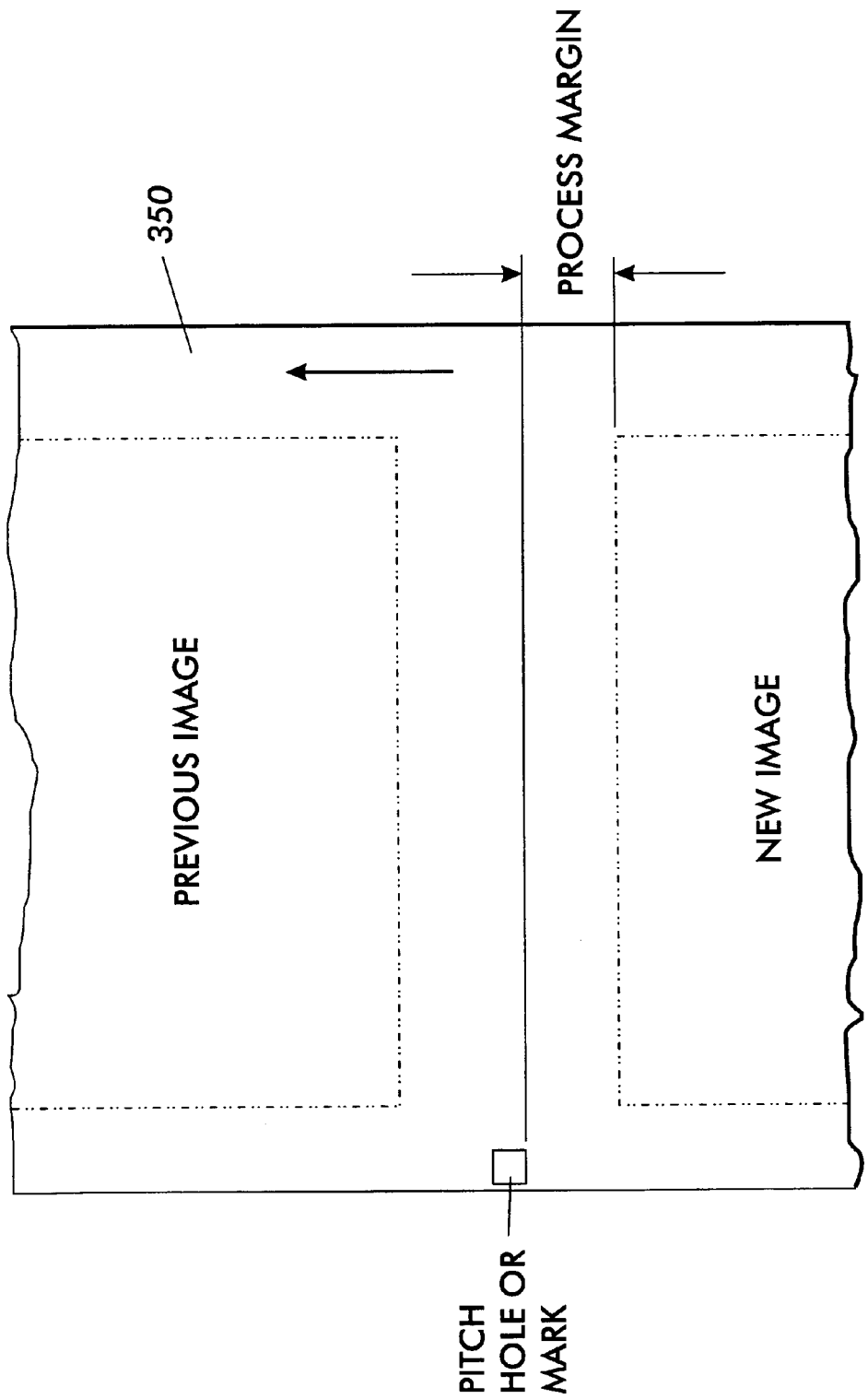
FIG. 9 illustrates the process margin to be adjusted.
Figure 10:
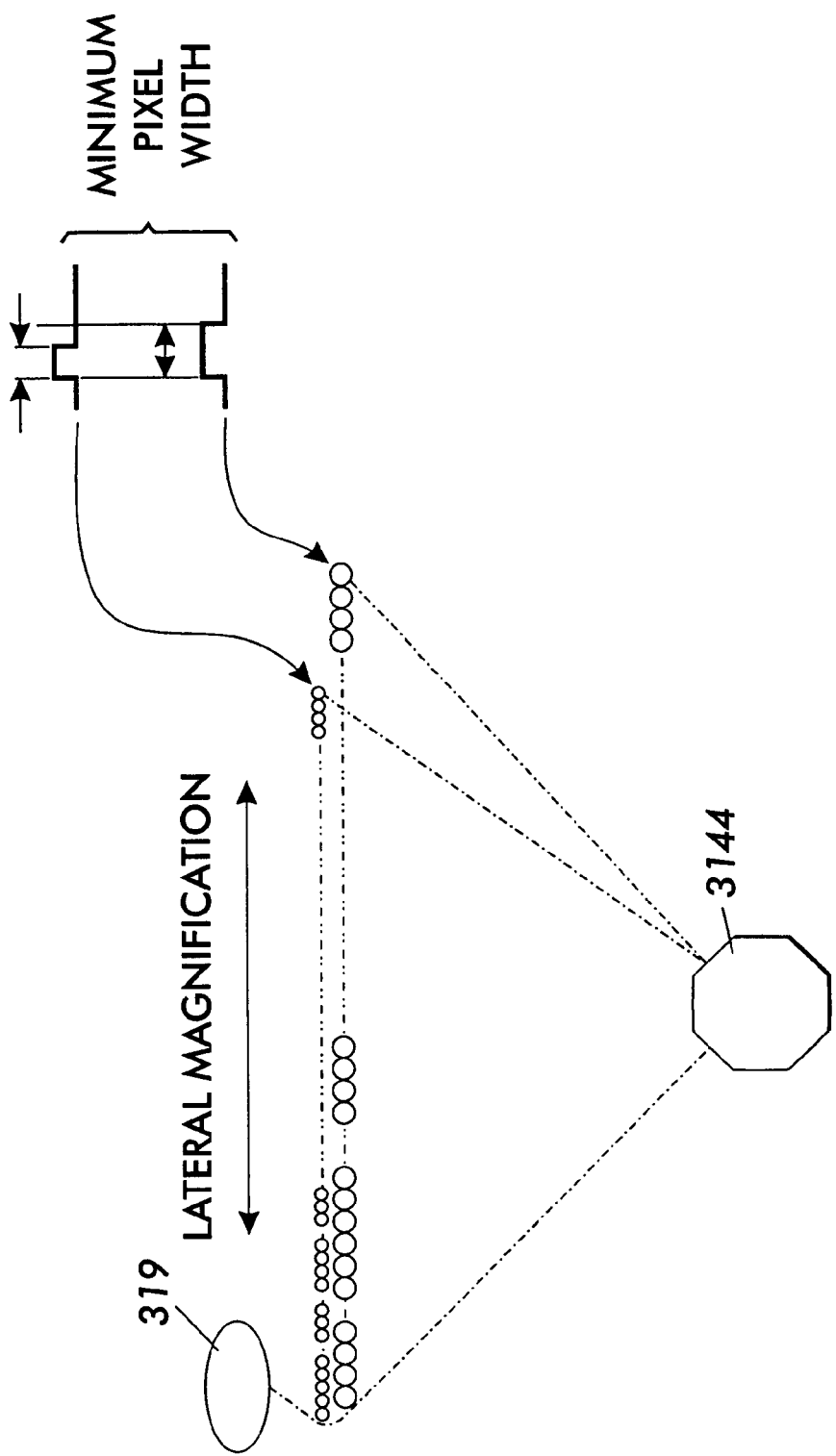
FIG. 10 illustrates how lateral magnification is adjusted.

FIG. 9 shows the delay between the pitch hole or mark and the first scanline in the image, i.e., the process margin. The process margin is adjusted by varying the full scanline and fractional delay in time or scanline counts through exposure station rephasing between the image panel, or the pitch signal. FIG. 10 shows the lateral magnification, which is the extension of a scanline in the lateral margin. The lateral magnification is extended by increasing the minimum pixel width. By rephasing an exposure station to vary the imager-specific predetermined process margin delay or vary the minimum pixel width, the different color image separation layers are aligned with one another.

As shown in FIG. 4, the image-on-image registration control circuit 240 includes a dynamic skew controller 241, a direct image registration controller 242, an input controller 244, and an output controller 246. The output controller 246 controls the output of the image data by the exposure stations 314–344. The input controller 244 receives the signals output from the dynamic skew control sensors 352 and 354 and the pair of direct image registration sensors 357.

It should be appreciated that while FIG. 4 shows the modulators 3141 as part of the exposure stations 314–344, the modulator 3141 for each of the exposure stations 314–344 could be incorporated into the output controller 246 as a portion of an integrated system. That is, the output controller 246 may directly output the modulator signals to the light emitting device 3142 to modulate the light beams 3143 by combining the timing and modulation functions. In this case, the signal lines from the start-of-scan sensors 319 of the imagers 310–340 will be connected directly to the output controller 246.

At machine start-up and when recovering from unknown conditions, a control set up procedure for the image-on-image control is performed. These are the only times the control set up procedure is performed.

Once initialized, the image-on-image registration control circuit 240 will monitor and control image registration with the dynamic skew control sensors 352 and 354 and the pair of direct image registration sensors 357, for example marks-on-belt sensors as discussed below, and output adjusted image control signals to the exposure stations 314–344. The two dynamic skew control sensors 352 and 354 measure the belt position of the photoreceptor belt 350 to infer lateral registration, while the pair of direct image registration sensors 357 measure lateral registration directly. Feedback from the two dynamic skew control sensors 352 and 354 is input to the dynamic skew controller 241. Feedback from the pair of direct image registration sensors 357 is input to the direct image registration controller 242.

As the dynamic skew control sensors 352 and 354 sense the instantaneous lateral position of the photoreceptor belt 350 at the steering and transfer ends S and T, respectively, the sensed results are input to the input controller 244. The dynamic skew controller 241 then modifies the control signals for the modulators 3141, without going off-line. The output controller 246 then controllably outputs the control signals to the exposure stations 314–344.

A nominal edge position table is obtained when the image processing apparatus 200 is first, or subsequently, machine set up. During machine set-up, the dynamic skew controller 241 collects data on the nominal position of the edge of the photoreceptor belt 350 at each of the dynamic skew control sensors 352 and 354 for each position along the photoreceptor belt 350. The dynamic skew controller 241 reduces this belt position data to an average edge profile and stores it in the nominal edge position table. The nominal edge position table has one entry for each sample position along the photoreceptor belt 350. The dynamic skew controller 241 then uses this nominal edge position table when determining the skew adjustments to be made during a print run.

The dynamic skew controller 241 modifies the image control data using, for example, the nominal edge position table. The nominal edge position table serves to link the machine set-up measurements and the dynamic skew adjustment measurements, because the nominal edge position table is generated when the machine set-up is performed. Accordingly, the belt position is known when the off-line machine set-up process is completed. Thus, the state of the belt position of the photoreceptor belt 350 is captured when the registration is initially set-up. Then, in operation, the measured belt position values are compared to nominal values in the nominal edge position table stored for the current position along the belt to determine the instantaneous belt skew based on the difference between the nominal belt edge positions and the sensed current belt edge positions.

During the dynamic skew control mode, the dynamic skew controller 241 subtracts, for each sample position, the value in the nominal edge position table for each of the dynamic skew control sensors 352 and 354 from the value of the corresponding sensor signal to determine the actual lateral position of the photoreceptor belt 350 at each of the dynamic skew control sensors 352 and 354. The dynamic skew controller 241 then determines the instantaneous belt skew as the difference between the actual belt position at each of the dynamic skew control sensors 352 and 354. The nominal edge position table and the sampled data are synchronized to the photoreceptor belt 350. Based on the resulting actual skew measurement, the image control adjustments to be made at the positions of the images 310–340 and/or the lateral paper registration are determined. The dynamic skew controller 241 continues to determine the instantaneous skew throughout the print run to keep the images laterally registered. This is described in the incorporated 101494 application.

In the dynamic skew control mode, the changes that come from the output of the dynamic skew controller 241 are changes with respect to the current skew relative to the learned skew measured during system set-up. This means that the adjustments are relative to the last set-up updates made. The instantaneous changes must be added to the set-up values. Thus, during the dynamic skew control mode, the total lateral margin adjustment is determined as:

$$LM_{T_t} = LM_S + \Delta S_{D_t} \quad (1)$$

where:

$LM_{T_t}$ is the total lateral margin adjustment for each image station at the current sample time;

$LM_S$ is the set-up lateral margin determined during off-line set-up; and $\Delta S_{D_t}$ is the change in the measured dynamic skew value for the current sample time.

The adjustments to the image control signals, and possibly the substrate registration control signals, made during the dynamic skew control mode are based on the observation that the photoreceptor belt 350 laterally moves in a linear fashion between any two points between the dynamic skew control sensors 352 and 354. By measuring the lateral position of the edge of the photoreceptor belt 350 at the dynamic skew control sensors 352 and 354, the lateral position of the photoreceptor belt 350 anywhere between the dynamic skew control sensors 352 and 354 can be approximated. The lateral position at any point of interest is determined by multiplying the total photoreceptor belt skew, which is the difference in lateral position at the dynamic skew control sensors 352 and 354, by the ratio of the distance from that point of interest to the dynamic skew control sensor 352 to the distance between the dynamic skew control sensors 352 and 354. If the point of interest is the position along the photoreceptor belt 350 at which a particular imager 310–340 is forming the corresponding scanline 318, the amount of skew at that position can thus be determined.

After an elapsed time measured by a timing device, a transition from the dynamic skew control mode to a direct image registration mode takes place. The elapsed time is based on either a fixed time from the beginning of a print job or based on measured registration or some other figure of merit. This transition is planned for a time when the amount of dynamic skew of the photoreceptor belt is largely completed. That is, that the photoreceptor belt 350 has mostly stopped skewing laterally, and thus reached a steady-state lateral skew offset.

The pair of sensors 357 includes an in-board sensor 357a, and an out-board sensor 357b, respectively. The direct image registration sensor pairs 357 directly measure the image registration offsets of the controlled features for writing the image data on the photoreceptor belt 350.

Registration offsets may include any or all of displacement components in the process direction, or the lateral direction transverse to the process direction, or magnification components in either the process direction or the transverse direction. That is, the controlled features for writing the image data on the photoreceptor belt 350 include, for example, the process margin, the image skew, the lateral margin, and the lateral magnification.

The sensed results from the pair of sensors 357a and 357b are then input to the input controller 244. The direct image registration controller 242 then modifies the image control signals to control, for example, the process margin, the image skew, the lateral margin, and the lateral image magnification, without going off-line, i.e., without stopping the printing process or skipping imaging panels.

It should be appreciated that any known or later developed mechanism, device or structure for determining the elapsed time may be used as the timing device, such as an RC circuit, a counter, a multi-stable multi-vibrator, or the like. In general, any device, which is capable of implementing the timing function, can be used to as the timing device.

The pairs of in-board and out-board sensors of the direct image registration sensors 357 may comprise, for example, pairs of marks-on-belt sensors 357a and 357b, that directly measure the positions of the color separation images on the image forming device. Each in-board sensor and each out-board sensor of the direct image registration sensors 357 measures the registration offsets between the different color separation images. An example of the marks-on-belt sensors is described in U.S. Pat. No. 5,537,190 to Folkins et al. incorporated herein by reference in its entirety.

To directly measure the positions of the color separation images, at least two marks are imaged onto the photoreceptor belt 350 for each of the color separation images along with the color separation images. In particular, a first mark is laterally displaced from a second mark. The in-board sensor of the corresponding pair of the registration sensors 357 detects at least the first mark while the out-board sensor detects at least the second mark. Differences in the components between the in-board and the out-board sensors in the process direction or the lateral direction, or magnification components in either or both of the process or lateral directions, indicate the registration offset in the image data for the process margin, the image skew, the lateral margin, and the lateral magnification, for example.

Figure 11:
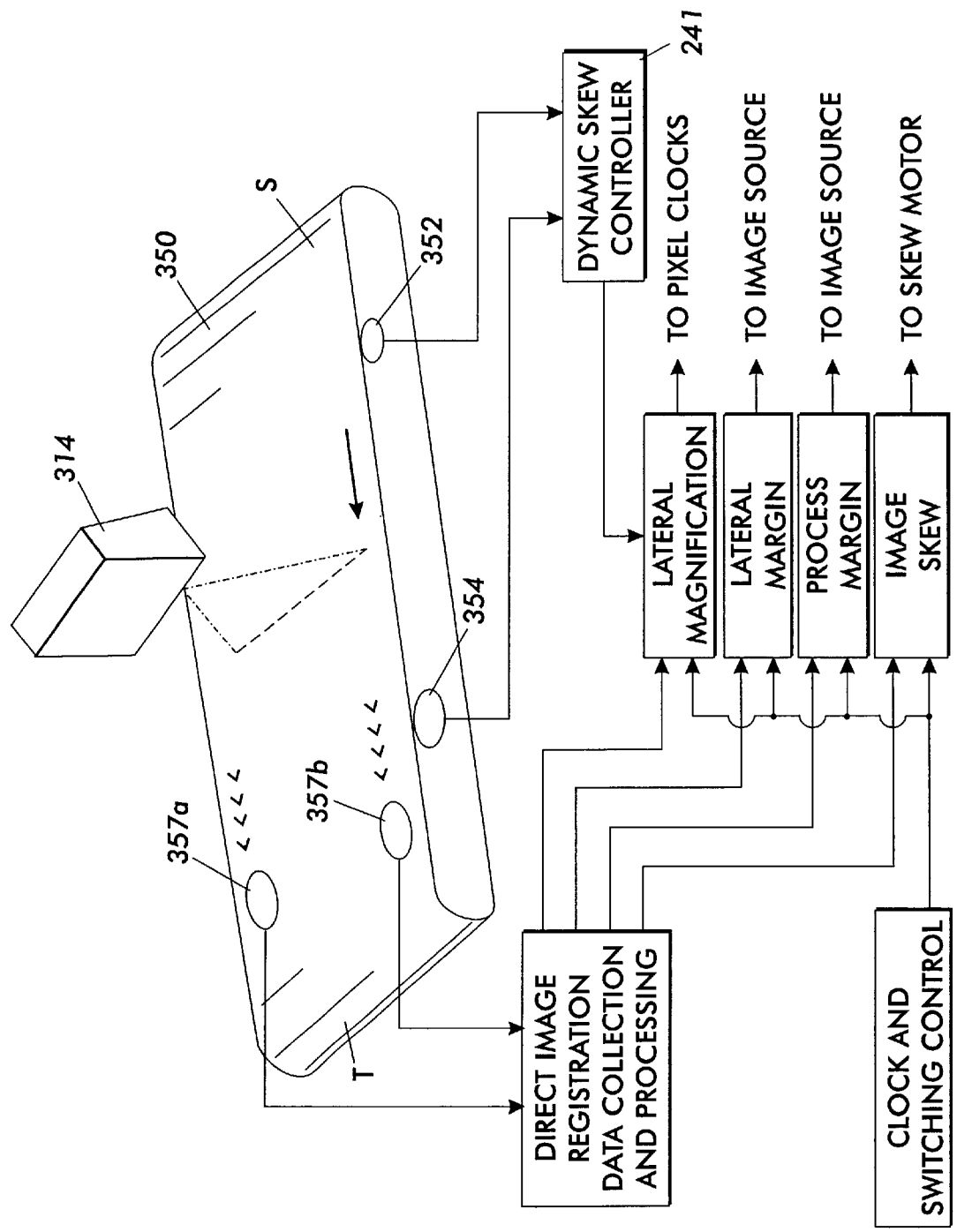
FIG. 11 shows in greater detail the direct image registration sensors shown in FIG. 4.

FIG. 11 shows one exemplary embodiment of the direct image registration sensors. As shown in FIG. 11, the direct image registration sensors 357 are used to collect data from marks on the photoreceptor belt 350, where the marks are made in inter-document zones between the image color separation layers. This data is processed into separate adjustments used to control the registration. The registration error is measured directly with the sensors 357. The direct image registration controller 242 samples the edges of the photoreceptor belt 350 at a much higher rate and infers the registration error by the motion of the photoreceptor belt 350.

Because starting-up the system includes a dynamic shift of the photoreceptor belt 350 at a rate which is faster than the sensors 357 can measure, the image-on-image registration control circuit 240 initially controls only the lateral margin, the only registration offset it can control without the data from the sensors 357. After a predetermined time or through an analysis of the photoreceptor belt motion, control switches to use the sensors 357 as the primary feedback mechanism. This allows the additional registration offsets to be tracked and actual registration measurements, rather than inferred ones, to be used in controlling the placement of the images on the photoreceptor belt 350.

It should be appreciated that any known or later developed mechanism, device or structure may be used to sense the process margin, the image skew, the lateral margin, and the lateral magnification, for example.

A nominal direct image registration table is also obtained when the image processing apparatus 200 is first, or subsequently, machine set-up. During machine set-up, the direct image registration controller 242 collects data on the nominal image source delay, the lateral margin, and the lateral magnification values of the photoreceptor belt 350 at the positions of the in-board and out-board sensors of the pair of the direct image registration sensors 357 for each color separation along the belt 350 relative to a reference separation. The reference color separation is typically the cyan color separation but is not limited to the cyan color separation. The direct image registration controller 242 reduces this data to an average, or otherwise filtered, direct image registration adjustment values and stores the direct image registration adjustment values in a nominal direct image registration table. The nominal direct image registration table has one entry for each adjustment for the lateral margin, the image skew, the lateral magnification and the process margin. The direct image registration controller 242 then uses this nominal direct image registration table initially at time t=0 and then when determining the adjustments to the lateral margin, the image skew, the lateral magnification and the process margin values to be made during a print run.

The direct image registration controller 242 modifies the image control signals that control the output of the image data using, for example, the nominal direct image registration position table. The nominal direct image registration position table serves to link the machine set-up measurements for the process margin, the image skew, the lateral margin, and the lateral magnification, for example, and the direct image registration adjustment measurements. Measured process margin, image skew, lateral margin, and lateral magnification values are used to determine the changes necessary to adjust the image registration. The determined changes, or instantaneous updates, are added to the nominal values determined in the set-up process.

In the direct image registration control mode, the changes that come from the output of the direct image registration controller 242 are changes with respect to the current images. This means that the adjustments are relative to the last updates made. The changes must be accumulated from update to update. The nominal direct image registration table and the sampled data are thus synchronized to the photoreceptor belt 350. The incorporated 880 application describes one technique for this synchronization. Based on the resulting actual measurements for the image skew, the lateral margin, the lateral magnification and the process margin values, the image adjustments to be made at the positions of the imagers 310–340 are determined. The direct image registration controller 242 continues to determine the instantaneous registration offsets throughout the print run to keep the images registered in the presence of thermal and other disturbances.

During the direct image registration control mode, the total lateral margin adjustment is determined as:

$$LM_{T_t} = LM_{T_{t-1}} + \Delta R_{LM_t}, \quad (2)$$

where:

$LM_{T_t}$ is the total lateral margin adjustment for an imager at the current sample time;

$LM_{T_{t-1}}$ is the previous total lateral margin adjustment for that imager from the last sample time; and $\Delta R_{LM_t}$ is the change in the direct image registration feedback value measured at the current sample time.

The total lateral magnification adjustment is determined as:

$$MAG_{T_t} = MAG_{T_{t-1}} \Delta R_{LMG_t}, \quad (3)$$

where:

$MAG_{T_t}$ is the total lateral magnification adjustment for an imager at the current sample time;

$MAG_{T_{t-1}}$ is the previous total lateral magnification adjustment for that imager from the last sample time; and $\Delta R_{LMG_t}$ is the change in the direct image registration feedback value measured at the current sample time.

The total process margin adjustment is determined as:

$$PM_{T_t} = PM_{T_{t-1}} + \Delta R_{PM_t}, \quad (4)$$

where:

$PM_{T_t}$ is the total process margin adjustment for an imager at the current sample time;

$PM_{T_{t-1}}$ is the previous total process margin adjustment for that imager from the last sample time; and $\Delta R_{PM_t}$ is the change in the direct image registration feedback value measured at the current sample time.

The total image skew adjustment is determined as:

$$IS_{T_t} = IS_{T_{t-1}} + \Delta R_{IS_t} \quad (5)$$

where:

$IS_{T_t}$ is the total image skew adjustment for an imager at the current sample time;

$IS_{T_{t-1}}$ is the previous total image skew adjustment for that imager from the last sample time; and $\Delta R_{IS_t}$ is the change in the direct image registration feedback value measured at the current sample time.

It should be appreciated that the sample time for the direct-registration loop need not be the same as the sample time for the dynamic skew controller loop. In the exemplary embodiment, the direct registration loop sample time is many times longer than that of the dynamic skew loop. In a similar manner, filtering of measurements in either case may be employed differently within each loop.

To coordinate the transition between the dynamic skew control mode and the direct image registration mode, a time-switched control scheme is used. The image-on-image control circuit 240 uses a priori information of the time-constant of the initial skew disturbance to decide when to switch from the dynamic skew controller 241 to the direct image registration controller 242.

Switching between the two controllers is necessary because the initial skew disturbance can be large and rather fast when compared to both the rate of direct image feedback and the magnitude of the potentially uncorrected errors. In particular, only the dynamic skew controller 241 has the bandwidth necessary to keep up with the rate of change of that initial skew disturbance. The pair of direct image registration sensors 357 cannot gather data fast enough while prints are being made due to the current structure of the machine architecture of known image output terminals. Of course, it should be appreciated that advances in technology may render the dynamic skew control mode irrelevant. That is, future image output terminals may be fully controllable from start-up using only the direct image registration control mode. In this case, the dynamic skew controller 241 and the corresponding methods may be omitted from the systems and methods of this invention.

Once the initial skew disturbance has stabilized, the control responsibility is passed to the direct image registration controller 242, which uses the pair of direct image registration sensors 357 as a feedback source. The offsets expected throughout the rest of the print run are primarily thermal offsets, which have a very slow time constant. The sampling rates achievable from the pair of direct image registration sensors 357 are sufficient to follow and measure these disturbances. The output controller 246 then controllably outputs the control signals to the exposure stations 314–344 accordingly.

Figure 12:
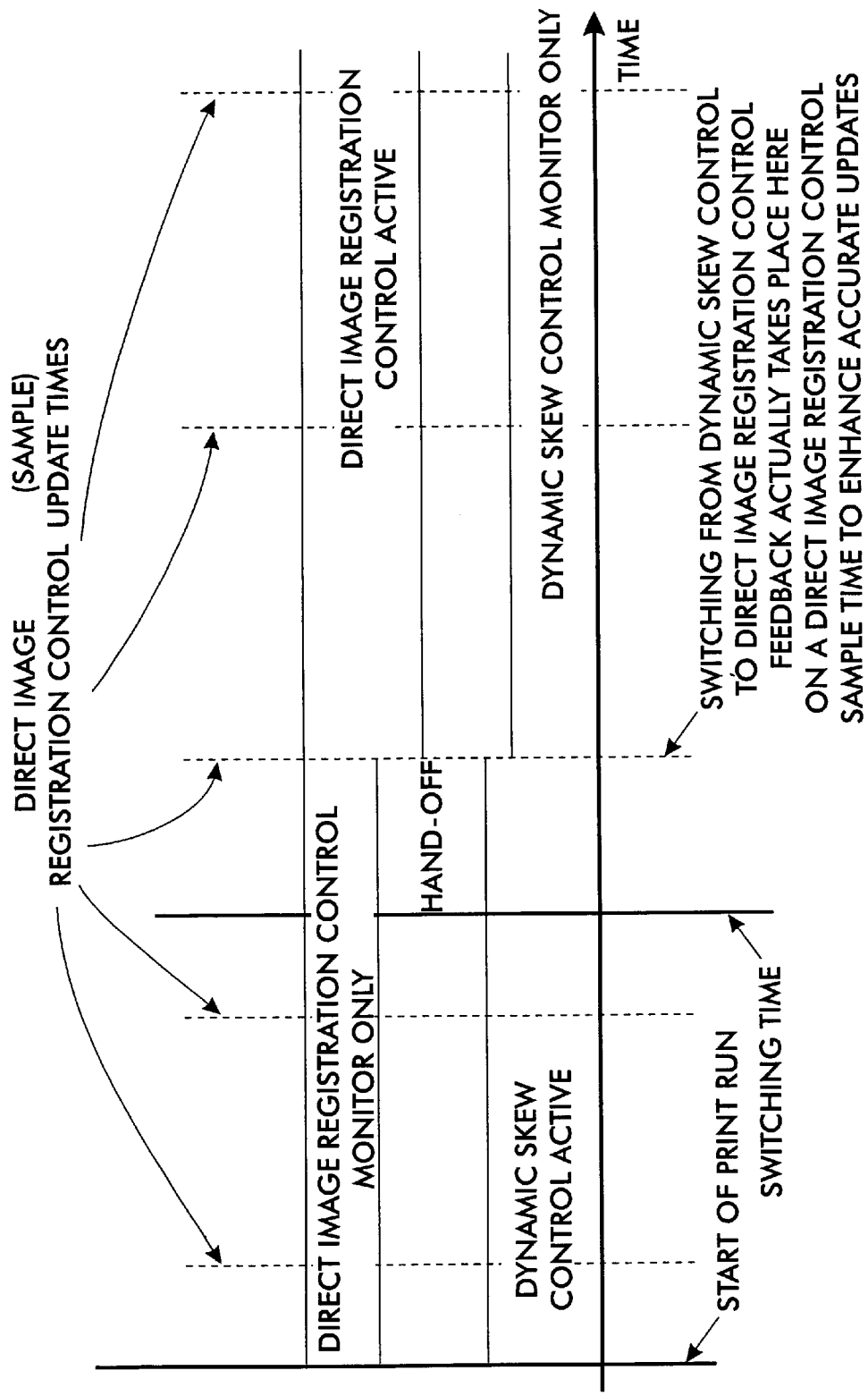
FIG. 12 illustrates the timing relationship between the dynamic skew control systems and methods and the direct image registration control systems and methods of the image-on-image control systems and methods according to this invention.

FIG. 12 shows an example illustrating the timing relationship between the dynamic skew control loop and the direct image registration control loop of the image-on-image controller 240. The image-on-image registration controller 240 starts from the beginning of the print run and initiates the transition at the specified time. FIG. 12 shows the two periods where the dynamic skew control loop and direct image registration control loop are active. A switching point is included to provide accurate registration adjustments. The switching point is shown where the two points overlap and the direct image registration loop is ready. Direct image registration data is collected at all times but it is not used until the direct image registration loop is enabled. The first direct image registration adjustment occurs in response to switching from the dynamic skew control loop to the direct image registration loop.

Switching occurs at a time when the direct image registration controller 242 is ready to make an adjustment. That is, if the direct image registration loop is not ready and the dynamic skew controller 241 stops making adjustments, a large lateral margin can occur until the direct image registration loop can measure and adjust for the error. Accordingly, the image-on-image controller 240 initiates the switching when the switching trigger time arrives, but does not complete the switching and the transfer of the latest dynamic skew adjustments until the next direct image registration update event occurs.

Once switching is completed, the dynamic skew controller 241 no longer needs to determine and send adjustments. However, the dynamic skew controller 241 must still monitor the skew of the photoreceptor belt and keep the current skew profile. This data will be necessary if the print run is stopped and then started up again. The skew profile learned during the direct image registration loop will form the reference for the dynamic skew adjustments at the beginning of the next print run, replacing the nominal skew table from off-line set-up, or if the current print run is restarted after being stopped. If the machine set-up is run, then the skew profile learned during that routine replaces whatever skew profile is currently in the dynamic skew controller.

During the switching, the total lateral margin adjustment is determined as:

$$LM_{T_t}=LM_S+\Delta S_{D_t} \tag{6}$$

where:

$LM_{T_t}$ is the total lateral margin adjustment for the current image;

$LM_S$ is the set-up lateral margin; and $\Delta S_{D_t}$ is the change in the lateral margin as measured by the dynamic skew system for the current sample time.

The total lateral magnification adjustment is determined as:

$$MAG_{T_t}=MAG_S+\Delta R_{LMG_t} \tag{7}$$

where:

$MAG_{T_t}$ is the total lateral magnification adjustment for the current image;

$MAG_S$ is the set-up lateral magnification; and $\Delta R_{LMG_t}$ is the change in the lateral magnification measured by the direct registration system for the current sample time.

The total process margin adjustment is determined as:

$$PM_{T_t}=PM_S+\Delta R_{PM_t} \tag{8}$$

where:

$PM_{T_t}$ is the total process margin adjustment for the current image;

$PM_S$ is the set-up process margin; and $\Delta R_{PM_t}$ is the change in the process margin measured by the direct registration system for the current sample time. The total image skew adjustment is determined as:

$$IS_{T_t}=IS_S+\Delta R_{IS_t} \tag{9}$$

where:

$IS_{T_t}$ is the total image skew adjustment for the current image;

$IS_S$ is the set-up image skew; and $\Delta R_{IS_t}$ is the change in the direct image registration feedback value measured by the direct registration system for the current sample time.

Because the direct image registration sensors 357 will only measure relative registration values, the procedure for determining the adjustments must be modified to accumulate the history of changes made previously. The adjustments thus become:

$$LM_{T_t}=LM_{T_{t-1}}+\Delta R_{LM_t}$$

$$MAG_{T_t}=MAG_{T_{t-1}}+\Delta R_{LMG_t}$$

$$PM_{T_t}=PM_{T_{t-1}}+\Delta R_{PM_t}$$

$$IS_{T_t}=IS_{T_{t-1}}+\Delta R_{IS_t}$$

Figure 13:
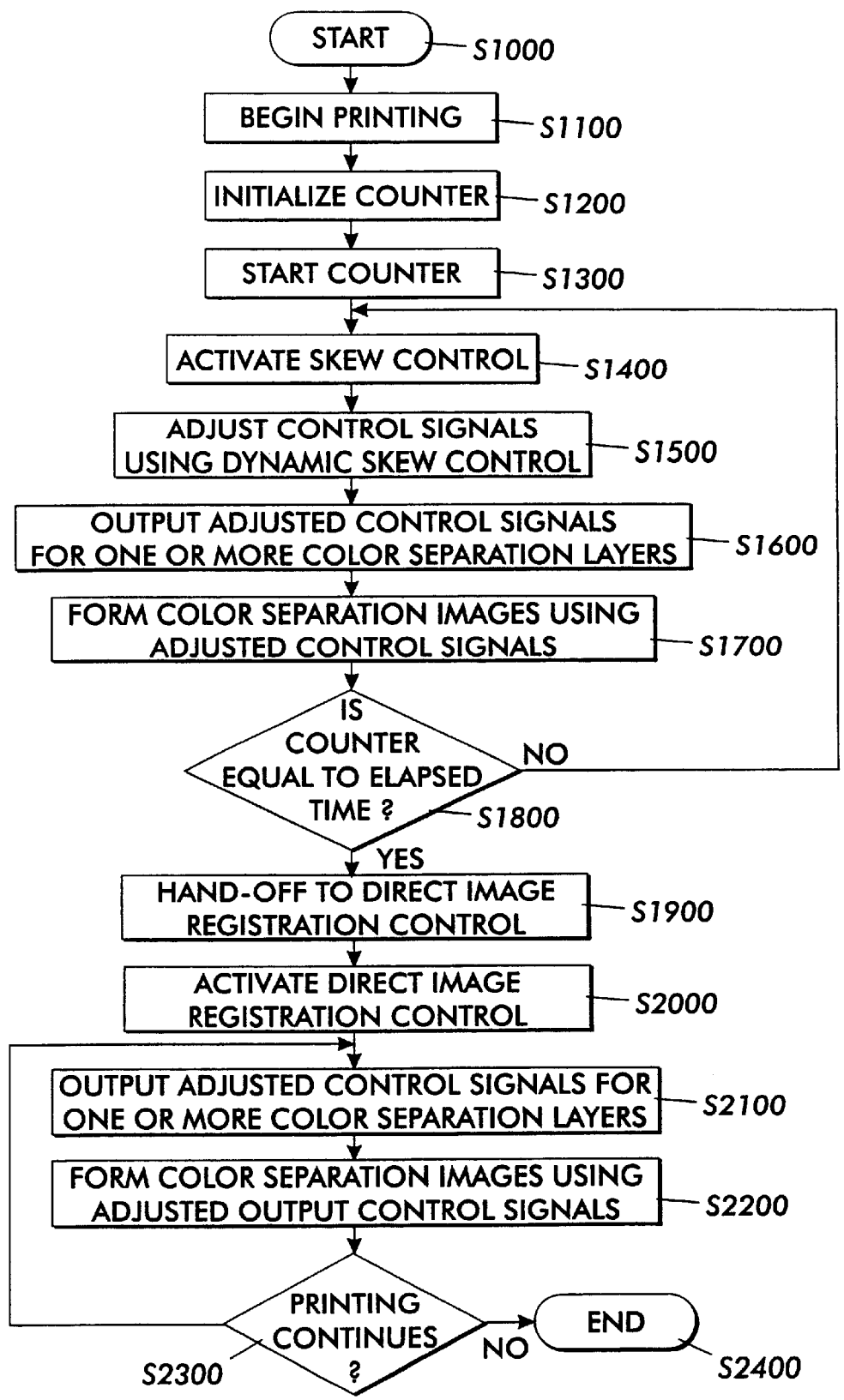
FIG. 13 is a flowchart outlining one exemplary embodiment of the control methods according to this invention.

FIG. 13 is a flowchart outlining one exemplary embodiment of a control method according to this invention for a typical printing operation. Beginning at step S1000, control continues to step S1100, where printing begins. Next, in step S1200, a timing device, such as a counter is initialized. Then, in step S1300, the timing device is started. Control then continues to step S1400.

In step S1400, dynamic skew control is activated. Then, in step S1500, specific control signals for the imagers are adjusted using the dynamic skew control to ensure the images remain laterally registered with each other. Next, in step S1600, the adjusted control signals for each imager are combined with the corresponding imager-specific predetermined lateral margin delay and output to the appropriate imager. Next, in step S1700, each color separation image is formed by the appropriate imager using the adjusted control signals, received start-of-scan signals and image data. Control then continues to step S1800.

In step S1800, control determines whether the value of the timing device indicates a predetermined elapsed time has occurred. If not, control returns to step S1400. Otherwise, once the predetermined time has elapsed for dynamic skew control, control continues to step S1900.

In step S1900, control begins switching from using dynamic skew control to using direct image registration control. Then, in step S2000, the direct image registration control is activated and switching from dynamic skew to direct image registration control is completed. Control then continues to step S2100.

In step S2100, the adjusted control signals for each imager are combined with the corresponding imager-specific predetermined lateral margin delay and output to the appropriate imager. Next, in step S2200, each color separation image is formed by the appropriate imager using the adjusted control signals, received start-of-scan signals and image data. Control then continues to step S2300.

In step S2300, a determination is made whether printing is to continue or if the printer is to stop running. If printing is to continue, control jumps back to step S2100. Otherwise, control continues to step S2400. That is, if printing continues, control loops through the measuring and registration error correcting steps until printing is completed. Control then continues to step S2400, where the control routine ends.

Figure 14:
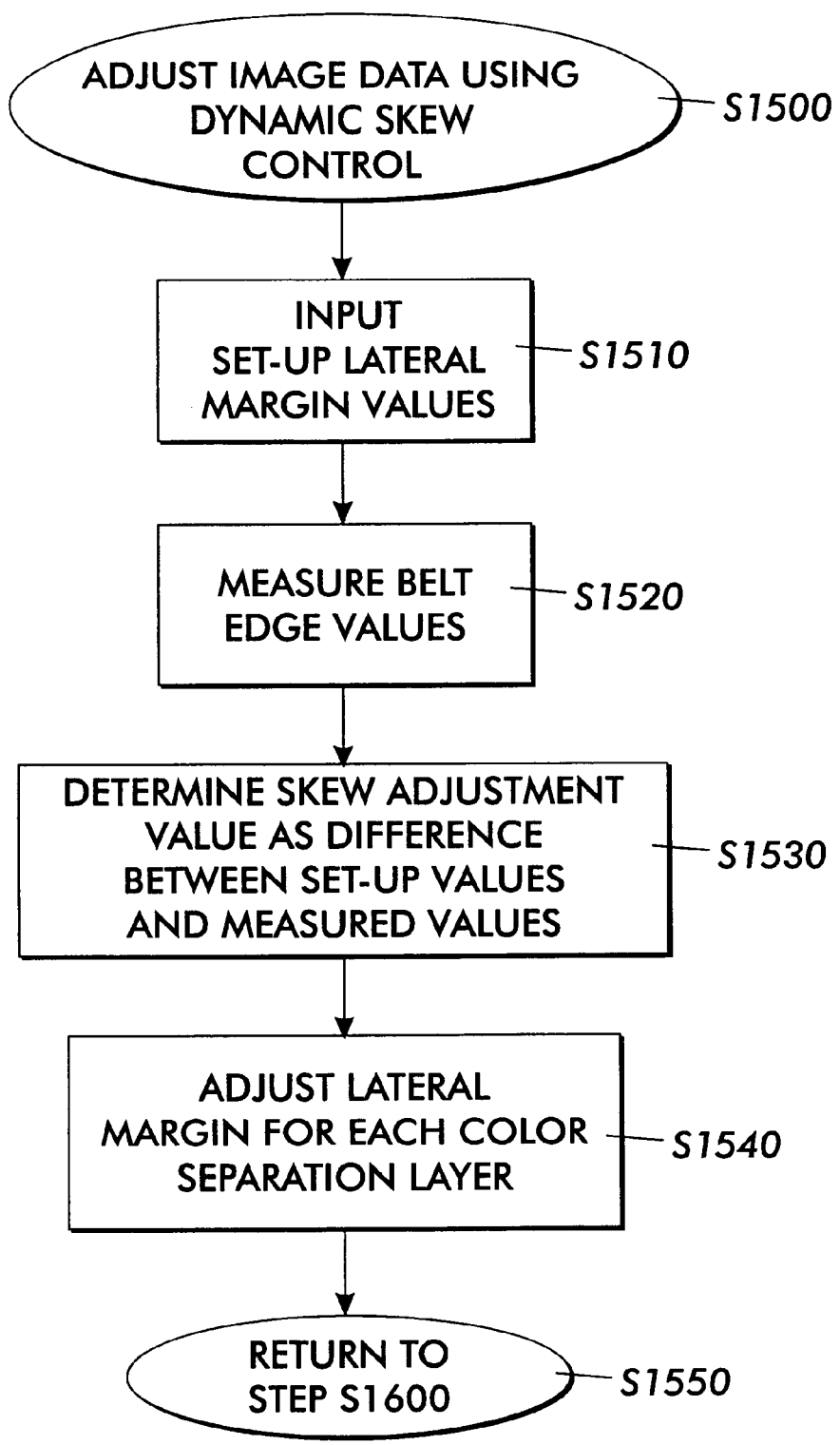
FIG. 14 is a flowchart outlining in greater detail one exemplary embodiment of the method for activating the dynamic skew control of FIG. 13.

FIG. 14 is a flowchart outlining in greater detail one exemplary embodiment of the method for activating dynamic skew control of step S1500. Starting at step S1500, control continues to step S1510, where the nominal values for the lateral margin are input. Next, in step S1520, the belt positions at each dynamic skew control sensor are used to determine the measured belt edge values between the dynamic skew sensors. Control then continues to step S1530.

In step S1530, the lateral margin adjustments to the control signals that control the output of the image data by each imager are determined based on the difference between the nominal values and the measured current values. In particular, as described above, the instantaneous belt skew is the difference between the nominal belt edge positions obtained during machine set-up and the sensed current belt edge positions. Based on the determined skew between the sensors, the control signal adjustments are determined to ensure the images remain laterally registered with each other. Control then continues to step S1540.

In step S1540, the control signals for each color separation image are adjusted to modify the lateral margin of the latent image on the photoreceptor belt so that any displayed or printed image created based on the adjusted control signals will appear without skew. Control then continues to step S1550, where the control routine returns to step S1600.

Figure 15:
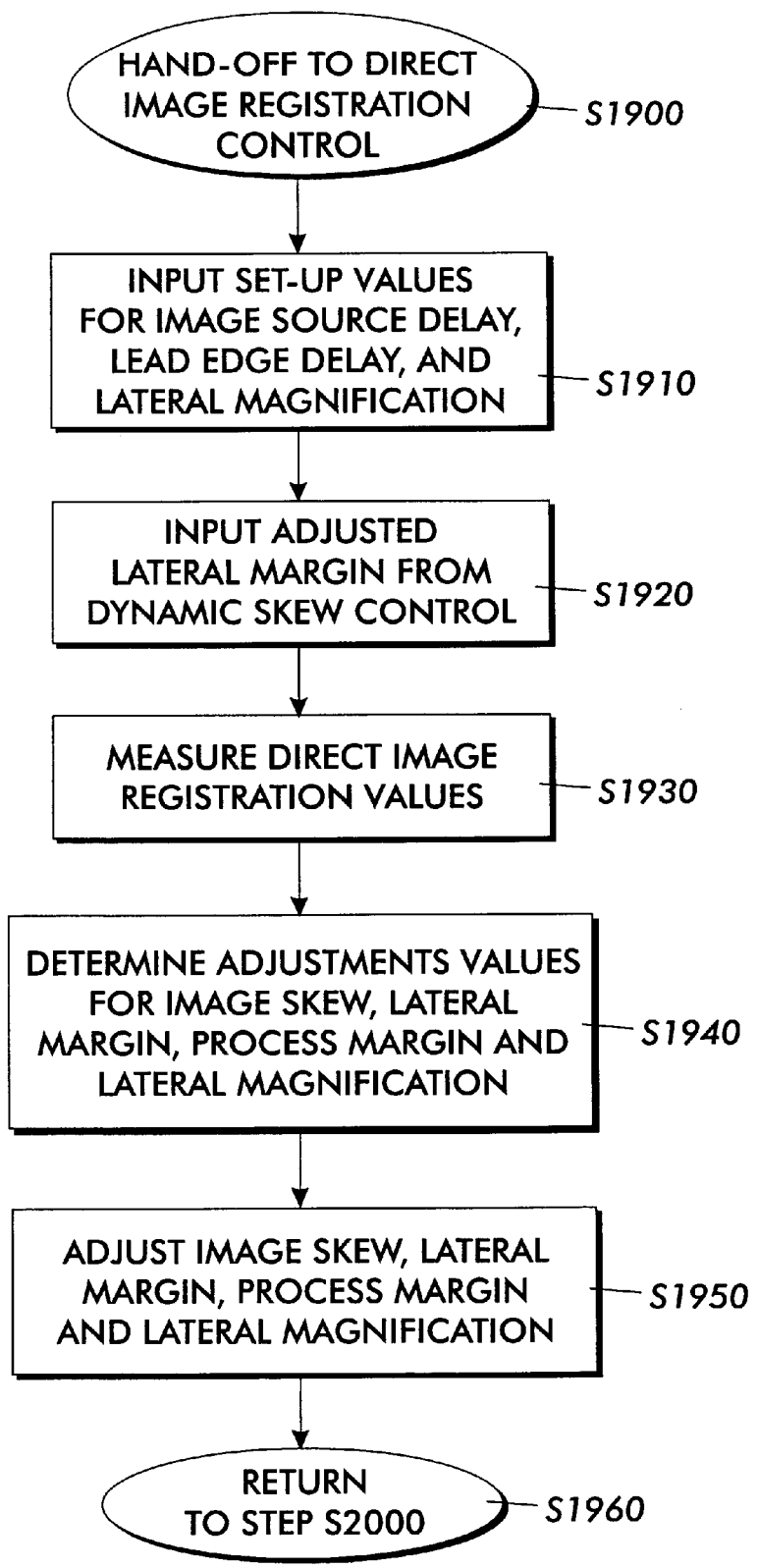
FIG. 15 is a flowchart outlining in greater detail one exemplary embodiment of the method for handing off from the skew control to the direct image registration control of FIG. 13.

FIG. 15 is a flowchart outlining one exemplary embodiment of the method for switching to direct image registration control of step 51900. Starting at step S1900, control continues to step S1910, where the nominal values for the lateral margin, the process margin, the lateral magnification and the image skew for the direct image registration are input. Next, in step S1920, the lateral margin data from the dynamic skew control is input from the dynamic skew control mode. Control then continues to step S1930.

In step S1930, the direct image registration data from each pair of direct image registration control sensors is used to determine the measured direct image registration values for the process direction margin, image skew, the lateral image margin, and the lateral magnification. Then, in step S1940, the direct image registration adjustments to the control signals that control the output of the image data by each imager are determined based on the measurements. In particular, the image skew, the process margin, the lateral margin and the lateral magnification data are differences between the nominal values obtained during machine set-up and the sensed current values. Based on the determined registration offsets, the control signal adjustments are determined to ensure the color separation images remain registered with each other. Control then continues to step S1950.

In step S1950, the image skew, the process margin, and/or the lateral image magnification data for each color separation layer are adjusted based on direct registration measurements, so that any displayed or printed image created based on the adjusted image control data will appear without any registration offset. The lateral margin correction is based on the final dynamic skew data collected. In all cases, these corrections form the first data upon which all subsequent ones will be accumulated. Control then continues to step S1960, where the control routine returns to step S2000.

As shown in FIG. 15, the lateral image margin during switching in step S1600 remains unchanged from the lateral image margin determined in step S1500.

Figure 16:
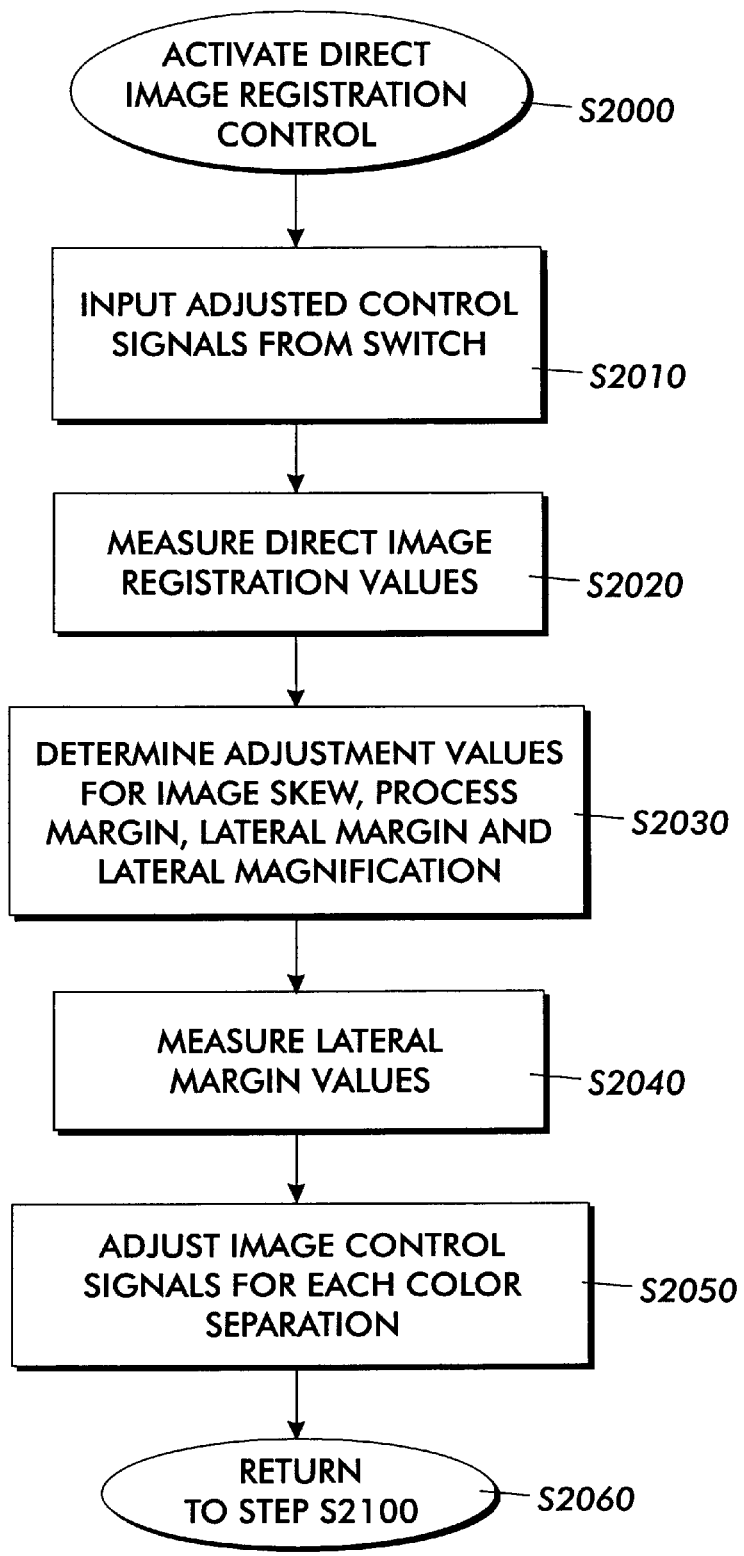
FIG. 16 is a flowchart outlining in greater detail one exemplary embodiment of the method for activating the direct image registration control of FIG. 13.

FIG. 16 is a flowchart outlining in greater detail one exemplary embodiment of the method for activating direct image registration control of step S2000. Starting in step S2000, control continues to step S2010, where the adjusted control signals determined just prior to switching are input. In particular, the adjusted lateral margin value, the adjusted image source delay values, the adjusted process margin values and the adjusted lateral magnification values are input. Next, in step S2020, the image registration values at the pair of direct image registration control sensors are used to determine the measured direct image registration values for the corresponding imager. Control then continues to step S2030.

In step S2030, the direct image registration adjustments to the control signals for each imager are determined based on the measured current values. In particular, the instantaneous image skew, the process margin value, the lateral margin value and the lateral magnification value are the sensed current values. Based on the determined registration offsets, the control signal adjustments are determined and accumulated to ensure the images remain registered with each other. Control then continues to step S2040.

In step S2040, the lateral margin values are determined and saved. Control then continues to step S2050.

In step S2050, the control signals for each color separation image are adjusted so that any displayed or printed image created based on the control signals, received start-of-scan signals and image data will appear without any registration offset. Control then continues to step S2060, where the control routine returns to step S2100.

It should be appreciated, as discussed above, that if the direct registration mode can be performed with sufficient bandwidth, it will not be necessary to use the dynamic skew control of steps S1400–S1700. In this case, at least steps S1400–S1700, S1920 and S2010 can be omitted, such that control jumps directly from step S1300 to step S1800, jumps from step S1910 directly to step S1930, and jumps directly from step S2000 to step S2020.

As shown in FIG. 2, the image processing apparatus 200 is preferably implemented on a programmed general purpose computer. However, the image processing apparatus 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing the finite state machine that is in turn capable of implementing the flowcharts shown in FIGS. 13–16, can be used to implement the image processing apparatus 200.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention.

For example, it is to be appreciated that this invention need not be used to determine skew in an image. For example, the invention could be used to determine the relative angle between line segments in an image. Thus, it should be appreciated that various other modifications and changes may occur to those skilled in the art without departing from the spirit and scope of this invention.

What is claimed is:

1. An image processing device, comprising:
    an image data input device that inputs image data representing an image;
    a photoreceptor belt;
    a plurality of image forming stations arranged along the photoreceptor belt, each image forming station forming an image from the image data;
    a plurality of first sensors provided along the edge of the photoreceptor belt, each sensor outputting a first sensor signal;
    a skew determining circuit that determines an amount of skew of the photoreceptor belt based on the first sensor signals;
    at least one set of second sensors provided along the surface of the photoreceptor belt, each second sensor outputting a second sensor signal;
    a direct registration determining circuit that determines registration offsets between the formed images based on the second sensor signals; and
    a registration adjusting circuit that controls formation of images by at least one of the image forming stations based on the image data and the determined amount of skew in a first mode, and based on the image data and the determined registration offsets in a second mode.

2. The image processing device of claim 1, wherein the registration adjustment circuit controls the formation of images by modifying a lateral margin based on the determined skew.

3. The image processing device of claim 1, wherein the registration adjustment circuit controls the formation of images by modifying an image skew based on the determined registration offsets.

4. The image processing device of claim 1, wherein the registration adjustment circuit controls the formation of images by modifying a process margin based on the determined registration offsets.

5. The image processing device of claim 1, wherein the registration adjustment circuit controls the formation of images by modifying a lateral margin based on the determined registration offsets.

6. The image processing device of claim 1, wherein the registration adjustment circuit controls the formation of images by modifying a lateral magnification based on the determined registration offsets.

7. The image processing device of claim 1, further comprising a timing device.

8. The image processing device of claim 7, wherein the registration adjustment circuit switches from the first mode to the second mode when the timing device times a predetermined elapsed time.

9. An image processing method for an image processing device having a plurality of image forming stations arranged along a photoreceptor belt, the method comprising:
    inputting image control data representing an image;
    sensing lateral positions of the photoreceptor belt at positions along the edge of the photoreceptor belt;
    determining an amount of skew of the photoreceptor belt between the positions based on the sensed lateral positions of the photoreceptor belt;
    sensing positions of a plurality of developed images formed on the photoreceptor belt at at least one location along the surface of photoreceptor belt;
    determining at least one registration offset between the plurality of developed images based on the sensed positions of the developed images; and
    forming the images based on the image data and the determined amount of skew in a first mode, and based on the image data and the at least one determined registration offset in a second mode.

10. The image processing method of claim 9, further comprising modifying a lateral margin based on the determined skew.

11. The image processing method of claim 9, further comprising modifying an image skew based on the at least one determined registration offset.

12. The image processing method of claim 9, further comprising modifying a process margin based on the at least one determined registration offset.

13. The image processing method of claim 9, further comprising modifying a lateral margin based on the at least one determined registration offset.

14. The image processing method of claim 9, further comprising modifying a lateral magnification based on the at least one determined registration offset.

15. The image processing device of claim 9, further comprising switching from the first mode to the second mode after a predetermined elapsed time.

16. An image processing method for an image processing device having a plurality of image forming stations arranged along a photoreceptor belt, the method comprising:
    inputting image data representing an image;
    sensing lateral positions of the photoreceptor belt at positions along the edge of the photoreceptor belt;
    determining an amount of skew of the photoreceptor belt between the positions based on the sensed lateral positions of the photoreceptor belt;
    sensing positions of at least one developed image formed on the photoreceptor belt at at least one location along the surface of photoreceptor belt;
    determining at least one registration offset between the developed image and a position remote from the developed image based on the sensed positions of the developed image; and
    forming the images based on the image data and the determined amount of skew in a first mode, and based on the image data and the at least one determined registration offset in a second mode.

17. The image processing device of claim 16, wherein the position remote from the developed image is a transfer position.

* * * * *